US012443703B2

(12) United States Patent
Nair

(10) Patent No.: US 12,443,703 B2
(45) Date of Patent: *Oct. 14, 2025

(54) SECURE SYSTEM AND METHOD FOR DETECTING CREDENTIAL STUFFING ATTACKS

(71) Applicant: Vivek Chinar Nair, Santa Clara, CA (US)

(72) Inventor: Vivek Chinar Nair, Santa Clara, CA (US)

(*) Notice: Subject to any disclaimer, the term of this patent is extended or adjusted under 35 U.S.C. 154(b) by 206 days.

This patent is subject to a terminal disclaimer.

(21) Appl. No.: 18/171,700

(22) Filed: Feb. 21, 2023

(65) Prior Publication Data

US 2023/0195887 A1 Jun. 22, 2023

Related U.S. Application Data

(63) Continuation-in-part of application No. 17/303,209, filed on May 24, 2021, now Pat. No. 12,058,121.

(60) Provisional application No. 63/268,912, filed on Mar. 4, 2022, provisional application No. 63/029,165, filed on May 22, 2020.

(51) Int. Cl.
*G06F 21/55* (2013.01)
*G06F 21/60* (2013.01)

(52) U.S. Cl.
CPC ............ *G06F 21/55* (2013.01); *G06F 21/602* (2013.01)

(58) Field of Classification Search
CPC ................................ G06F 21/55; G06F 21/602
See application file for complete search history.

(56) References Cited

U.S. PATENT DOCUMENTS

| | | | |
|---|---|---|---|
| 2007/0006305 A1* | 1/2007 | Florencio | H04L 63/1483 726/22 |
| 2007/0199054 A1* | 8/2007 | Florencio | H04L 63/1483 726/5 |
| 2018/0176212 A1* | 6/2018 | Nair | H04L 63/0838 |
| 2019/0007387 A1* | 1/2019 | Jin | G06F 16/951 |
| 2019/0007428 A1* | 1/2019 | Moen | H04L 67/02 |
| 2019/0205512 A1* | 7/2019 | Franco | H04L 9/088 |
| 2020/0137109 A1* | 4/2020 | Endler | H04L 63/1425 |
| 2020/0213334 A1* | 7/2020 | Kutner | H04L 63/1416 |
| 2020/0250296 A1* | 8/2020 | Zhao | G06F 21/45 |
| 2020/0280573 A1* | 9/2020 | Johnson | G06F 21/316 |
| 2020/0304544 A1* | 9/2020 | Vasanthapuram | H04L 63/20 |
| 2021/0117533 A1* | 4/2021 | Malka | G06F 21/31 |
| 2021/0288981 A1* | 9/2021 | Numainville | H04L 63/1416 |
| 2021/0367934 A1* | 11/2021 | Nair | H04L 9/0643 |
| 2023/0131437 A1* | 4/2023 | Shirvanian | H04L 9/3231 713/155 |
| 2023/0195887 A1* | 6/2023 | Nair | G06F 21/55 726/26 |

* cited by examiner

*Primary Examiner* — David J Pearson
*Assistant Examiner* — Nega Woldemariam
(74) *Attorney, Agent, or Firm* — Robinson IP Law, PLLC

(57) ABSTRACT

A secure system for detecting credential stuffing attacks includes: a plurality of secure services hosted on at least one server; and a central coordinator which stores data relating to the plurality of secure services; whereby at least one of the plurality of secure services communicates with the central coordinator to determine whether a credential used in a login attempt on one of the plurality of secure services is used by a user of another of the plurality of secure services.

19 Claims, 31 Drawing Sheets

Correlation Matrix 114

(Prior Art) FIG. 1

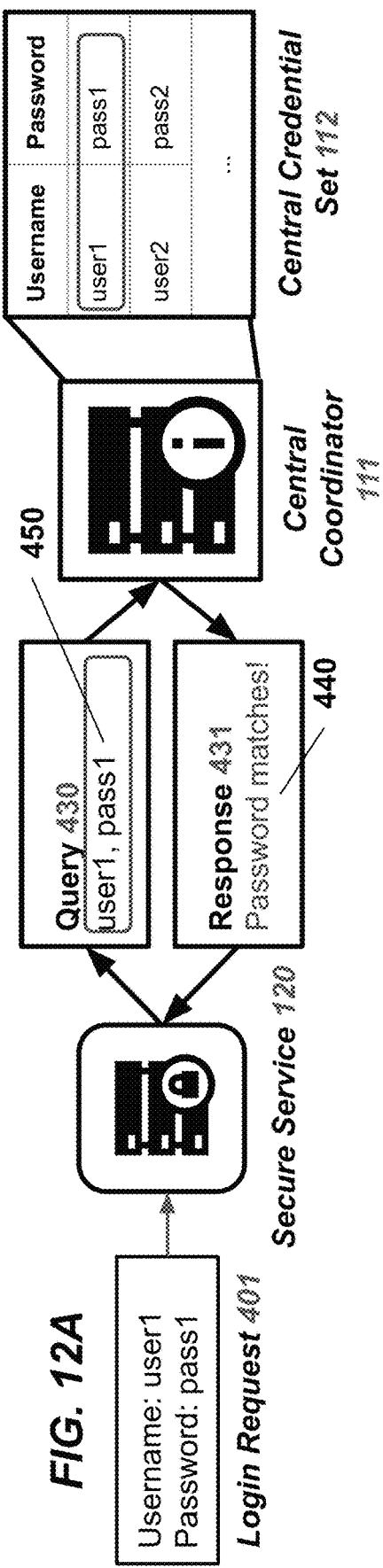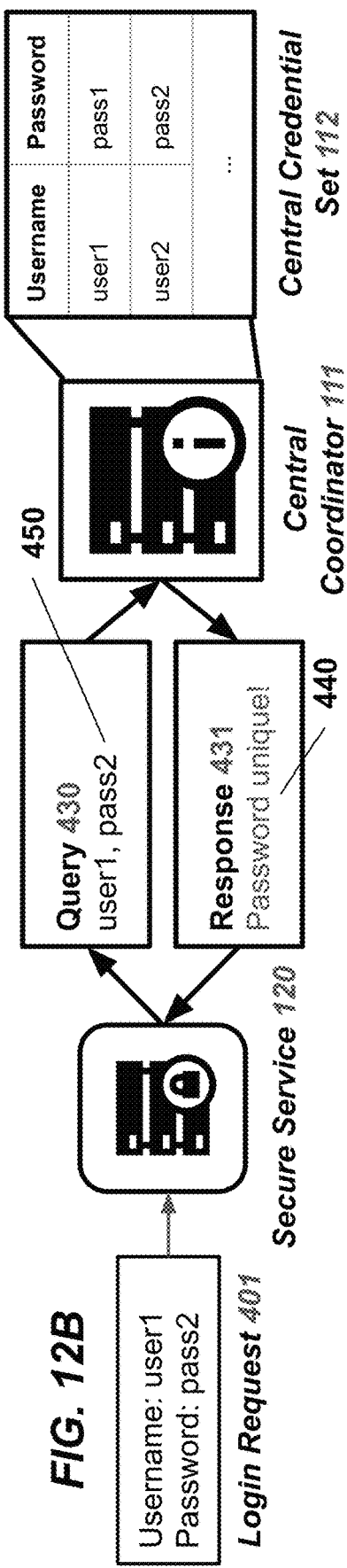
FIG. 12A
FIG. 12B

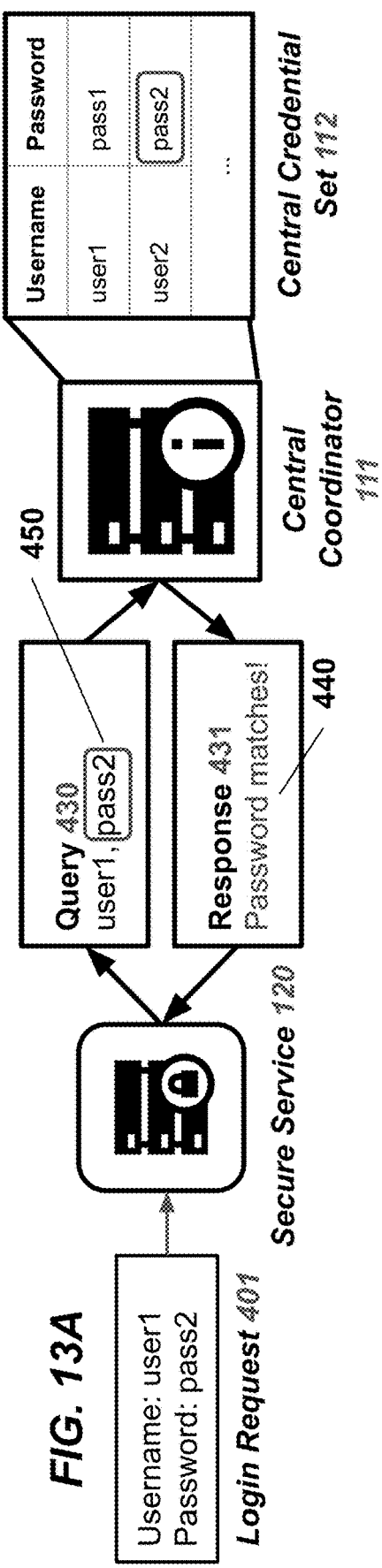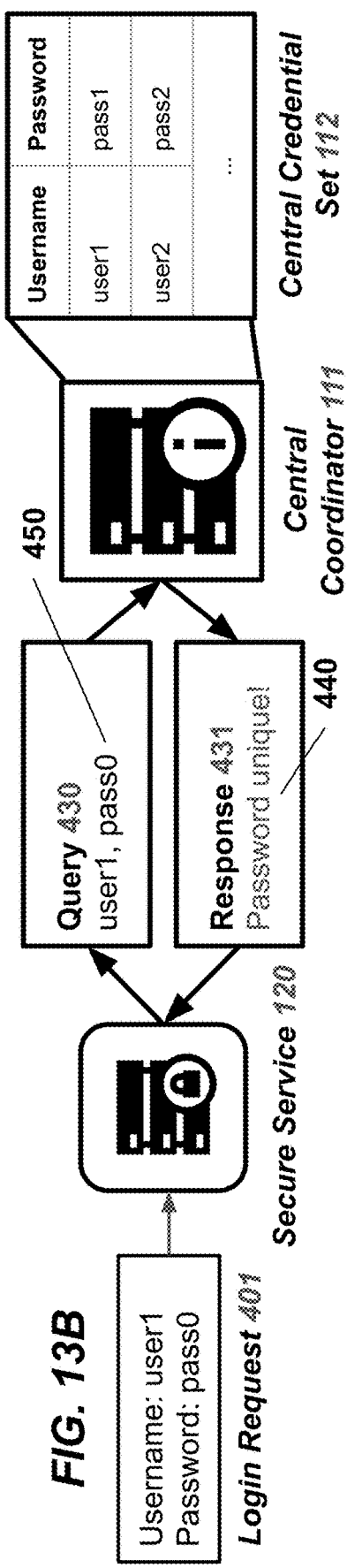
FIG. 13A
FIG. 13B

SECURE SYSTEM AND METHOD FOR DETECTING CREDENTIAL STUFFING ATTACKS

CROSS-REFERENCE TO RELATED APPLICATION(S)

This application claims priority to and is a non-provisional of U.S. Application Ser. No. 63/268,912 for a Secure System and Method for Detecting Credential Stuffing Attacks filed on Mar. 4, 2022, and is a continuation-in-part of U.S. application Ser. No. 17/303,209 filed on May 24, 2021, which claims priority to U.S. Patent Application Ser. No. 63/029,165 filed on May 22, 2020, the contents of which are incorporated herein by reference in its entireties.

FIELD

This disclosure relates to the field of user authentication. More particularly, this disclosure relates to systems and methods for detecting credential stuffing attacks.

BACKGROUND

Secret credentials such as passwords and private keys are used in many user authentication schemes to authenticate users attempting to access secure systems. FIG. 1 illustrates an exemplary user login process. An end user 131 submits user credentials 145, for example, a username and password, to a secure service 120 for authentication by transmitting a user login request 401. Users are generally allowed to choose their own password when creating a new account with a service. Many users reuse the same credential across multiple independent services in what is known as "cross-site credential reuse." FIG. 2A illustrates cross-site credential reuse by an end user 131. Cross-site credential reuse has the effect of allowing access to a user's various accounts across multiple secure services using the same set of credentials. It is estimated that approximately 81% of internet users have demonstrated cross-site credential reuse by using the same password across two or more sites and that 25% of users reuse a single password across the majority of their accounts. Users who select a distinct password or key for each service on which they hold an account are practicing "cross-site credential differentiation." FIG. 2B illustrates cross-site credential differentiation by an end user 131. Cross-site credential differentiation has the effect of allowing at most one user account across all services to be accessed using a given credential. It is estimated that less than 20% of internet users practice perfect cross-site credential differentiation.

The widespread occurrence of cross-site credential reuse enables attackers who obtain user credentials 145 from one service to use the same credentials to access accounts on other services where the credentials were reused. This type of attack, where stolen account credentials from one service are used to compromise accounts on a separate service, often with the use of automated software to make large volumes of requests, is known as "credential stuffing." Steps 301-303 of FIG. 3 illustrate a typical credential stuffing attack. In step 301, an end user 131 demonstrates cross-site credential reuse by using the same username and password on two separate services, "Service A" 121 and "Service B" 122. In step 302, Service A 121 experiences a data breach event whereby stolen credentials 149 are obtained by an attacker 139. Because the end user 131 used the same credentials on both services, the stolen credentials 149 from Service A 121 can then be used by the attacker 139 to access the user's account on Service B 122, even though Service B 122 has not itself experienced a data breach (step 303). It is estimated that credential stuffing attacks account for over 30 billion malicious login attempts per year.

Various approaches for the prevention of credential stuffing attacks are presently in use. One approach to preventing credential stuffing attacks presently in use is rate limiting. Because credential stuffing attacks often involve millions of malicious login attempts, services can attempt to detect an unusually high volume of login traffic as an indication that a credential stuffing attack is occurring. By restricting login attempts per IP address, attackers may be throttled while leaving normal users largely unaffected. In practice, the use of botnets, proxies, and VPN servers allow IP-based rate limiting to be circumvented. The use of CAPTCHAs and proof-of-work algorithms to limit high-volume credential stuffing attacks without significantly impacting normal users has also been proposed. However, these strategies promise to at best throttle the rate of credential stuffing attacks rather than preventing them entirely. An additional approach presently in use is the implementation of password strength requirements to increase the difficulty of credential stuffing attacks. While password strength restrictions can prevent cross-site credential reuse in the event of conflicting requirements, they often lead users to use a single complex password across all of their accounts instead of practicing cross-site credential differentiation. Another credential stuffing prevention approach currently in use involves collecting extensive blacklists of credentials that are known to have been compromised in previous data breaches. However, credentials will not appear on these blacklists until after the data breach leaking those credentials is identified and contained, which may not occur until well after a data breach has occurred. During the period between a data breach taking place and the breach being detected, attackers are free to conduct credential stuffing attacks without any risk of being thwarted by the inclusion of the leaked credentials on a credential blacklist. Therefore, all of these approaches fail to completely prevent credential stuffing attacks. However, rapid detection of credential stuffing attacks can allow actions to be taken to mitigate their impacts. What is needed, therefore, is a system and method for detecting credential stuffing attacks.

SUMMARY

In some aspects, the techniques described herein relate to a centralized system for detecting credential stuffing attacks including: a plurality of secure services hosted on at least one server; and a central coordinator which stores data relating to the plurality of secure services; whereby at least one of the plurality of secure services communicates with the central coordinator to determine whether a credential used in a login attempt on one of the plurality of secure services is used by a user of another of the plurality of secure services.

In some aspects, the techniques described herein relate to a centralized system for detecting credential stuffing attacks, wherein the central coordinator stores both current and previous credentials.

In some aspects, the techniques described herein relate to a centralized system for detecting credential stuffing attacks, wherein bulk requests are used to perform more than one operation in a single query.

In some aspects, the techniques described herein relate to a centralized system for detecting credential stuffing attacks, wherein at least one of the plurality of secure services communicates with the central coordinator to determine whether a credential used in a login attempt is used by a particular user across another of the plurality of secure services.

In some aspects, the techniques described herein relate to a centralized system for detecting credential stuffing attacks, wherein at least one of the plurality of secure services communicates with the central coordinator to determine whether a credential used in a login attempt is used across different users across another of the plurality of secure services.

In some aspects, the techniques described herein relate to a centralized system for detecting credential stuffing attacks, wherein cryptographic hashes of credentials are used by the central coordinator.

In some aspects, the techniques described herein relate to a centralized system for detecting credential stuffing attacks, wherein the central coordinator uses the data relating to the plurality of secure services to compute a correlation matrix of the login traffic and credential sets of secure services.

In some aspects, the techniques described herein relate to a centralized system for detecting credential stuffing attacks, wherein the central coordinator uses values in the correlation matrix to detect a credential stuffing attack.

In some aspects, the techniques described herein relate to a centralized system for detecting credential stuffing attacks, wherein the parties involved in a credential stuffing attack take automated measures to mitigate the attack after being notified.

In some aspects, the techniques described herein relate to a centralized system for detecting credential stuffing attacks, wherein the central coordinator stores credentials that are known to be compromised.

In some aspects, the techniques described herein relate to a centralized system for detecting credential stuffing attacks, wherein a private set intersection of credentials is computed.

In some aspects, the techniques described herein relate to a decentralized system for detecting credential stuffing attacks including: a plurality of secure services hosted on at least one server; whereby at least one of the plurality of secure services communicates with at least one other of the plurality of secure services to determine whether a credential used in a login attempt for one of the plurality of secure services is used by another of the plurality of secure services.

In some aspects, the techniques described herein relate to a decentralized system for detecting credential stuffing attacks, wherein at least one of the plurality of secure services stores previous credentials in addition to current credentials.

In some aspects, the techniques described herein relate to a decentralized system for detecting credential stuffing attacks, wherein bulk requests are used to perform more than one operation in a single query.

In some aspects, the techniques described herein relate to a decentralized system for detecting credential stuffing attacks, wherein at least one of the plurality of secure services communicates with at least one other of the plurality of secure services to determine whether a credential used in a login attempt for one of the plurality of secure services is used by a particular user in another of the plurality of secure services.

In some aspects, the techniques described herein relate to a decentralized system for detecting credential stuffing attacks, wherein at least one of the plurality of secure services communicates with at least one other of the plurality of secure services to determine whether a credential used in a login attempt matches a credential used by different users in another of the plurality of secure services.

In some aspects, the techniques described herein relate to a decentralized system for detecting credential stuffing attacks, wherein at least one of the plurality of secure services stores cryptographic hashes of credentials.

In some aspects, the techniques described herein relate to a decentralized system for detecting credential stuffing attacks, wherein a private set intersection of the credentials used in login attempts for one of the plurality of secure services and the credentials used by another of the plurality of secure services is computed.

In some aspects, the techniques described herein relate to a decentralized system for detecting credential stuffing attacks, wherein secure multi-party computation is used to compute a correlation matrix of the login traffic and credential sets of the secure services.

In some aspects, the techniques described herein relate to a federated system for detecting credential stuffing attacks including: a plurality of secure services hosted on at least one server; a plurality of service providers hosted on at least one server; whereby at least one of the plurality of secure services communicates with at least one other of the plurality of service providers to determine whether a credential used in a login attempt on one of the plurality of secure services is used by a user of another of the plurality of secure services; and and whereby at least one of the plurality of service providers communicates with at least one other of the plurality of service providers to determine whether a credential used in a login attempt on one of the plurality of secure services is used by a user of another of the plurality of secure services.

In some aspects, the techniques described herein relate to a federated system for detecting credential stuffing attacks, wherein at least one of the plurality of service providers stores previous credentials in addition to current credentials.

In some aspects, the techniques described herein relate to a federated system for detecting credential stuffing attacks, wherein bulk requests are used to perform more than one operation in a single query.

In some aspects, the techniques described herein relate to a federated system for detecting credential stuffing attacks, wherein at least one of the plurality of secure services communicates with at least one of the plurality of service providers to determine whether a credential used in a login attempt on one of the plurality of secure services is used by the same user of another of the plurality of secure services.

In some aspects, the techniques described herein relate to a federated system for detecting credential stuffing attacks, wherein at least one of the plurality of secure services communicates with at least one of the plurality of service providers to determine whether a credential used in a login attempt on one of the plurality of secure services is used across different users of another of the plurality of secure services.

In some aspects, the techniques described herein relate to a federated system for detecting credential stuffing attacks, wherein at least one of the plurality of service providers stores cryptographic hashes of credentials.

In some aspects, the techniques described herein relate to a federated system for detecting credential stuffing attacks, wherein a private set intersection of credentials is computed.

In some aspects, the techniques described herein relate to a federated system for detecting credential stuffing attacks, wherein secure multi-party computation is used to compute a correlation matrix of the login traffic and credential sets of the secure services.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 12A shows a process of a secure service querying a central coordinator with a credential matching the same end user according to one embodiment of the present disclosure;

FIG. 12B shows a process of a secure service querying a central coordinator with a credential not matching the same end user according to one embodiment of the present disclosure;

FIG. 13A shows a process of a secure service querying a central coordinator with a credential matching a different end user according to one embodiment of the present disclosure;

FIG. 13B shows a process of a secure service querying a central coordinator with a unique credential according to one embodiment of the present disclosure;

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Embodiments of a system and method for detecting credential stuffing attacks described herein may be implemented using various components such as one or more computers, computer readable storage mediums, and computer networks for storing and transmitting data as described in greater detail below. The system and method for detecting credential stuffing attacks is operable across multiple components using network connectivity, servers, databases, and devices such as smartphones or personal computers to receive and transmit data between components.

Figure 4:
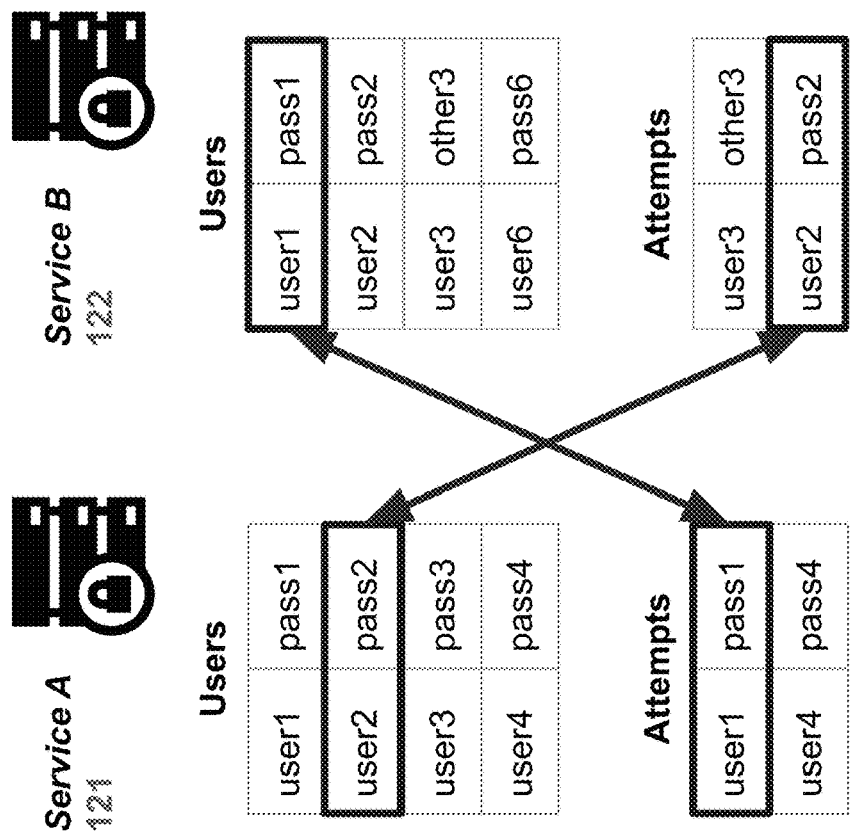
FIG. 4 shows a cross-site login traffic correlation matrix during normal login activity according to one embodiment of the present disclosure.

FIG. 4 shows two secure services 120, "Service A" 121 and "Service B" 122, along with the user credentials 145 and login attempts for each service during normal usage. Due to the natural incidence of cross-site credential reuse, some login attempts of Service A 121 may coincide with the user credentials 145 of Service B 122. Considering now several such services, the degree of correlation between the login traffic 143 of each service and the user credentials 145 of each service can be plotted in a table or "correlation matrix" 114 as shown on the right-hand side of FIG. 4.

Figure 5:
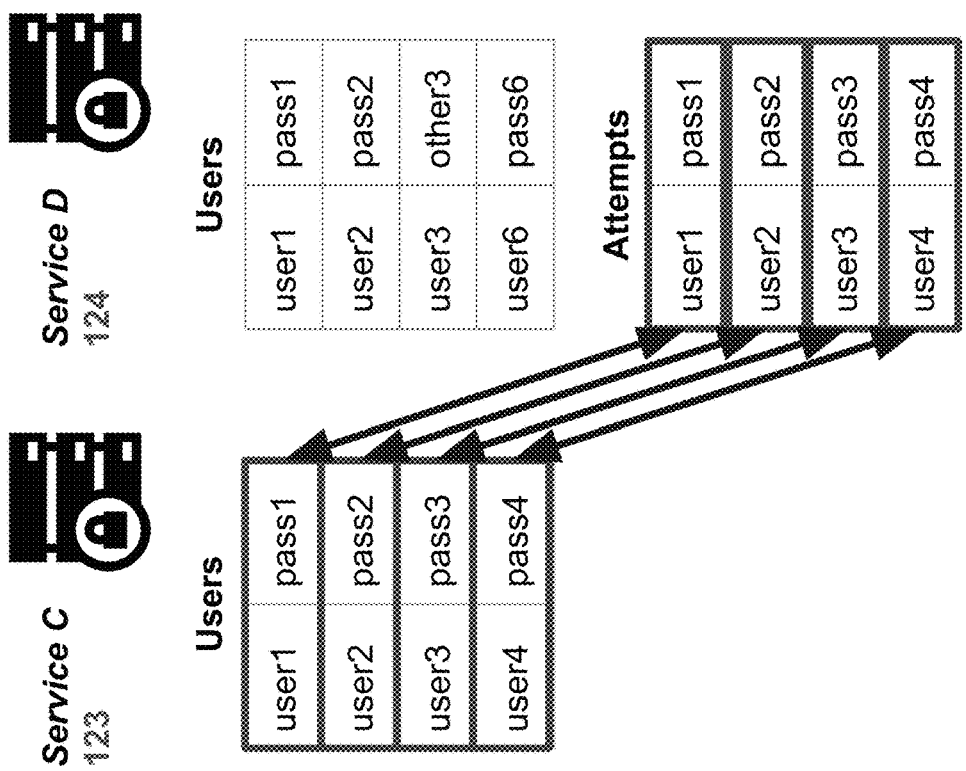
FIG. 5 shows a cross-site login traffic correlation matrix during a credential stuffing attack according to one embodiment of the present disclosure.

FIG. 5 shows two secure services 120, "Service C" 123 and "Service D" 124, along with the user credentials 145 and login attempts for each service during a credential stuffing attack where credentials stolen from Service C 123 are being used to attack Service D 124. As the credentials used in sign-in attempts to Service D 124 are sourced directly from Service C 123, many of the login attempts from Service D 124 match the user credentials of Service C 123. Therefore, there will be a high degree of correlation between the login traffic 143 of Service D and the user credentials 145 of Service C, and the cell in the correlation matrix corresponding to the login traffic 143 of Service D and the user credentials 145 of Service C will display an anomalously high value, as shown on the right-hand side of FIG. 5. The propensity of a credential stuffing attack to result in an anomalously high value in a correlation matrix between user credentials 145 and login traffic 143 presents an opportunity for detecting credential stuffing attacks. By constructing a correlation matrix between the user credentials 145 and login traffic 143 of several services and monitoring said matrix for anomalously high correlation values, such a system has the potential to not only detect when a service is being attacked, but also the source of credentials used during the attack, thereby further aiding in the early detection of data breaches.

Figure 6:
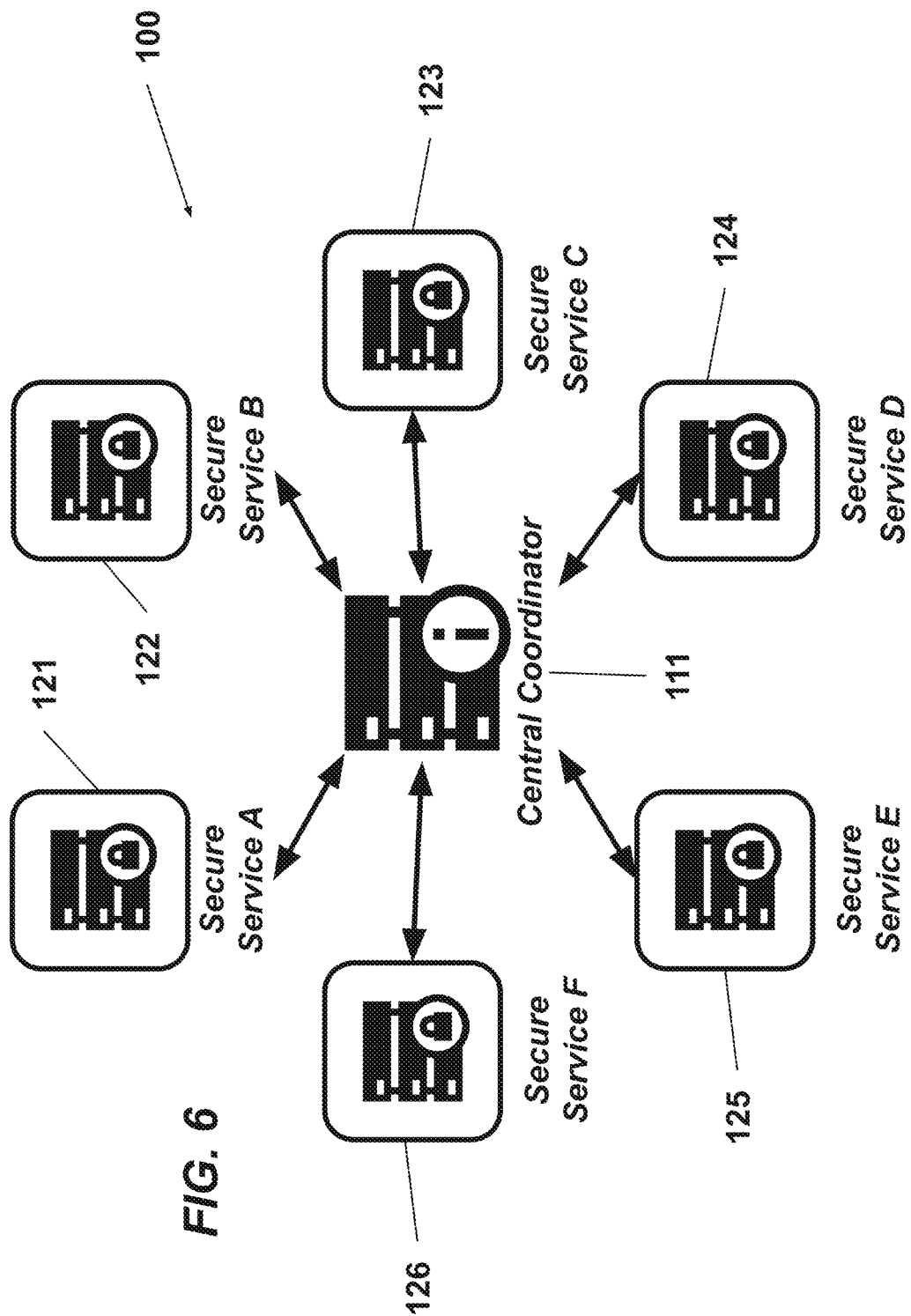
FIG. 6 shows a diagram of a centralized system and method for detecting credential stuffing attacks according to one embodiment of the present disclosure.

FIG. 6 shows a basic embodiment of a centralized system for detecting credential stuffing attacks 100 using two or more secure services 121-126 in communication with a central coordinator 111. The two or more secure services 121-126 transmit user credentials 145 and login traffic 143 to the central coordinator 111, which is used to determine the correlation between the login traffic 143 of secure services 120 and the user credentials 145 of other secure services 120. The term "secure service" as used herein may refer to a service where the use of credentials is required to access some or all functions of the service. In one embodiment, the central coordinator 111 maintains a record of user credentials 145 across associated services, for example in a plaintext, encrypted, or hashed format. When a secure service 120 receives a login attempt, the service may query the central coordinator 111 to determine if the credential matches an existing credential associated with a separate secure service 120. If the service determines that the credential in the login attempt matches a credential known to the central coordinator 111, there is an increased likelihood that the login attempt was part of a credential stuffing attack.

Figure 7:
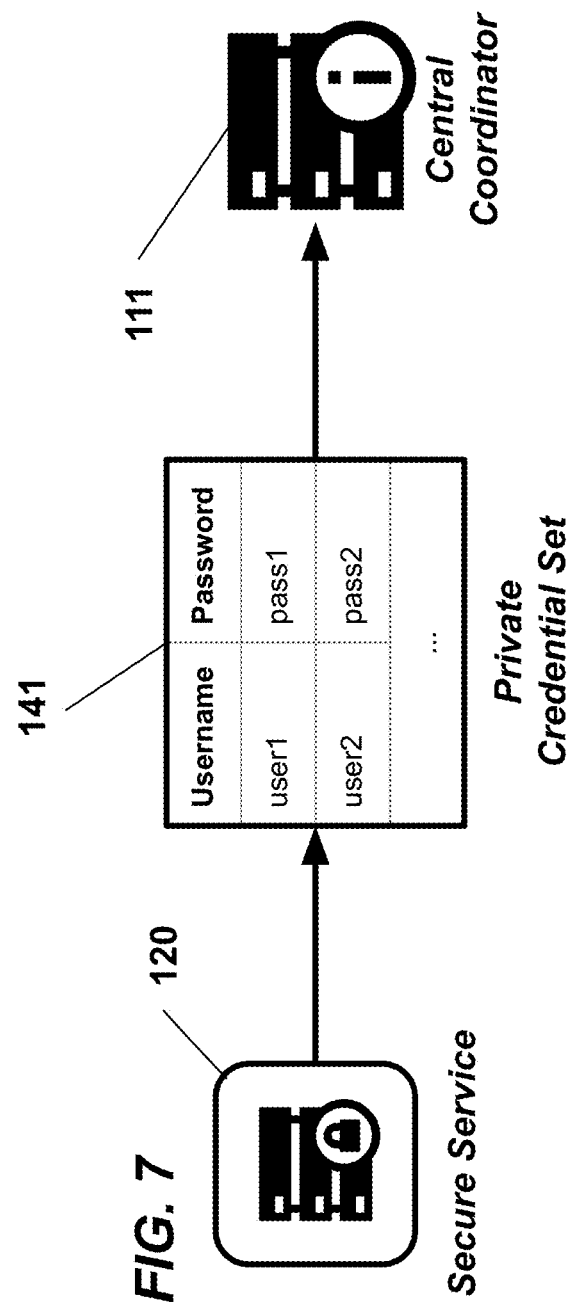
FIG. 7 shows a process of a secure service uploading a credential set to a central coordinator according to one embodiment of the present disclosure.

Referring to FIG. 7, in one embodiment, a secure service 120 uploads a private credential set 141 to a central coordinator 111. During a set up process, the secure service 120 provides the credentials associated with all of its existing user accounts to a central coordinator 111. The central coordinator 111 stores these credentials to be later queried by other services. The secure service 120 providing the private credential set 141 to the central coordinator 111 benefits from doing so by potentially allowing for the early detection of a data breach.

Figure 1:
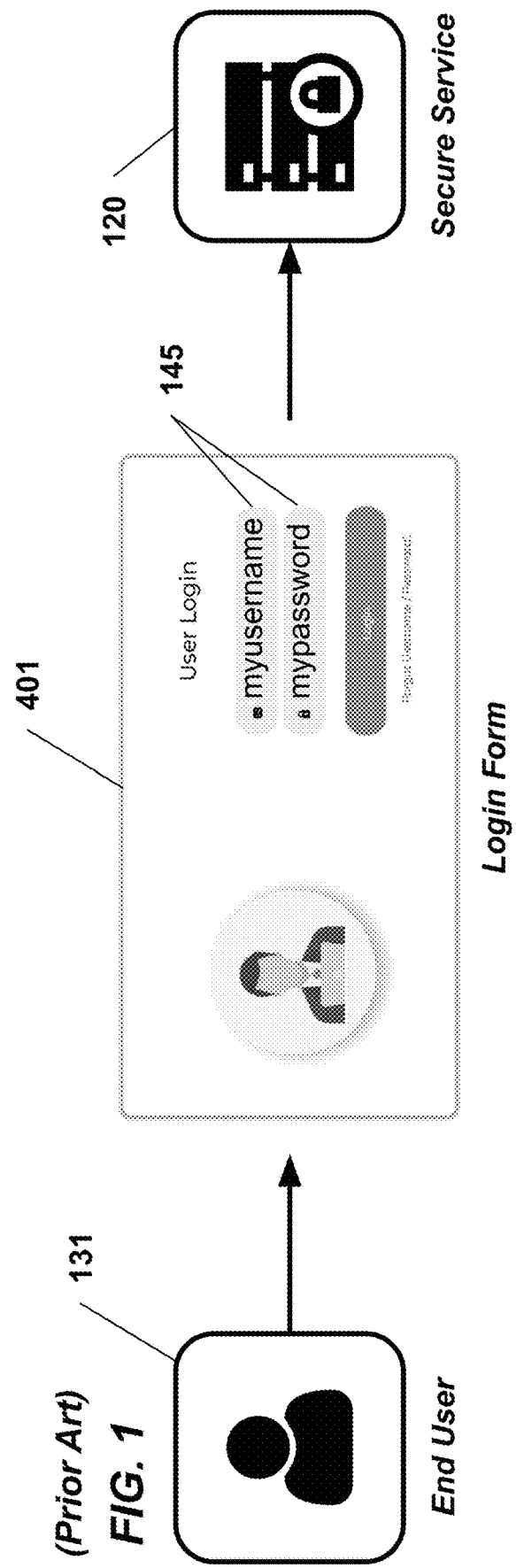
FIG. 1 shows a process of an end user accessing a secure service using a private credential.
Figure 2:
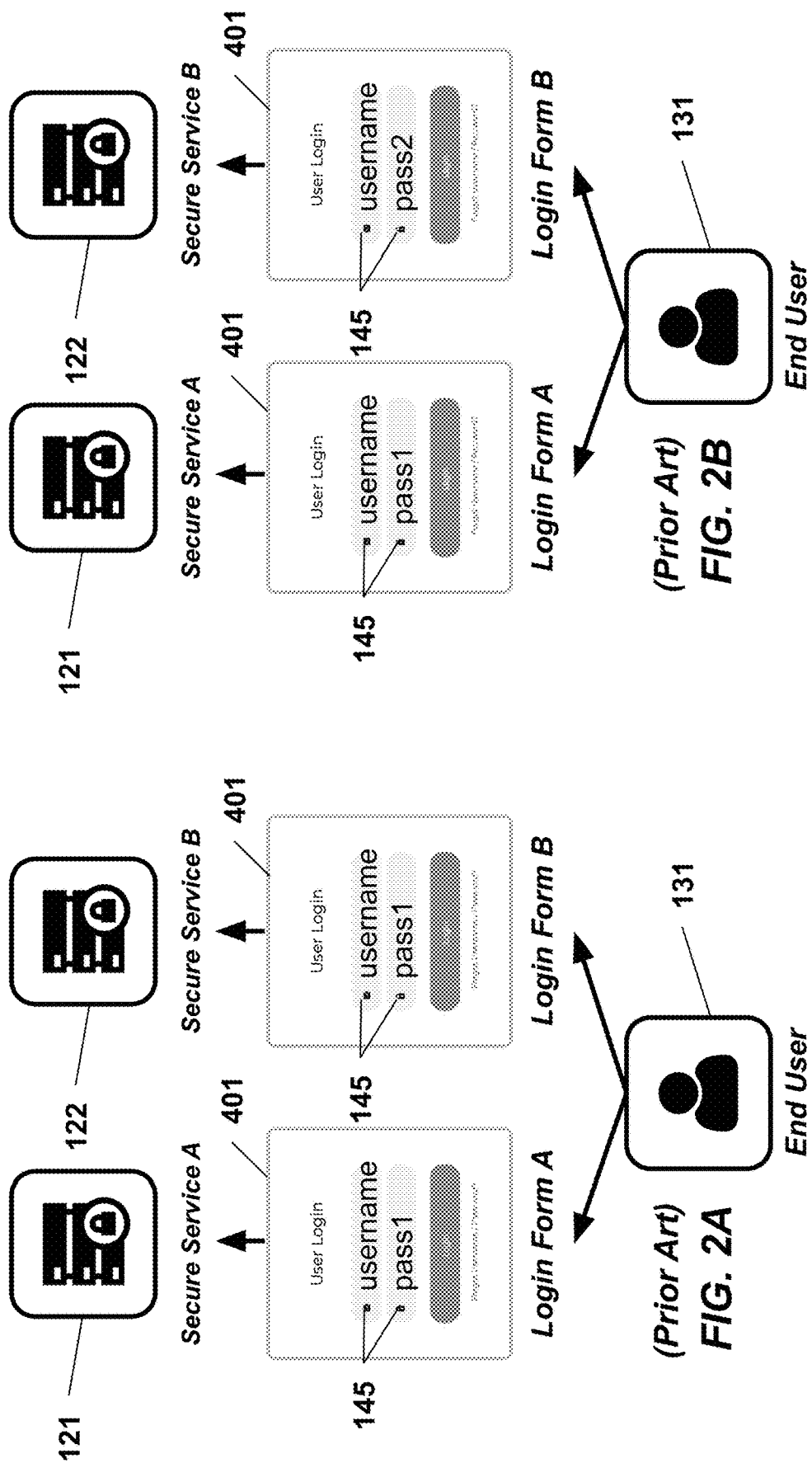
FIG. 2A shows cross-site credential reuse by an end user.
FIG. 2B shows cross-site credential differentiation by an end user.
Figure 3:
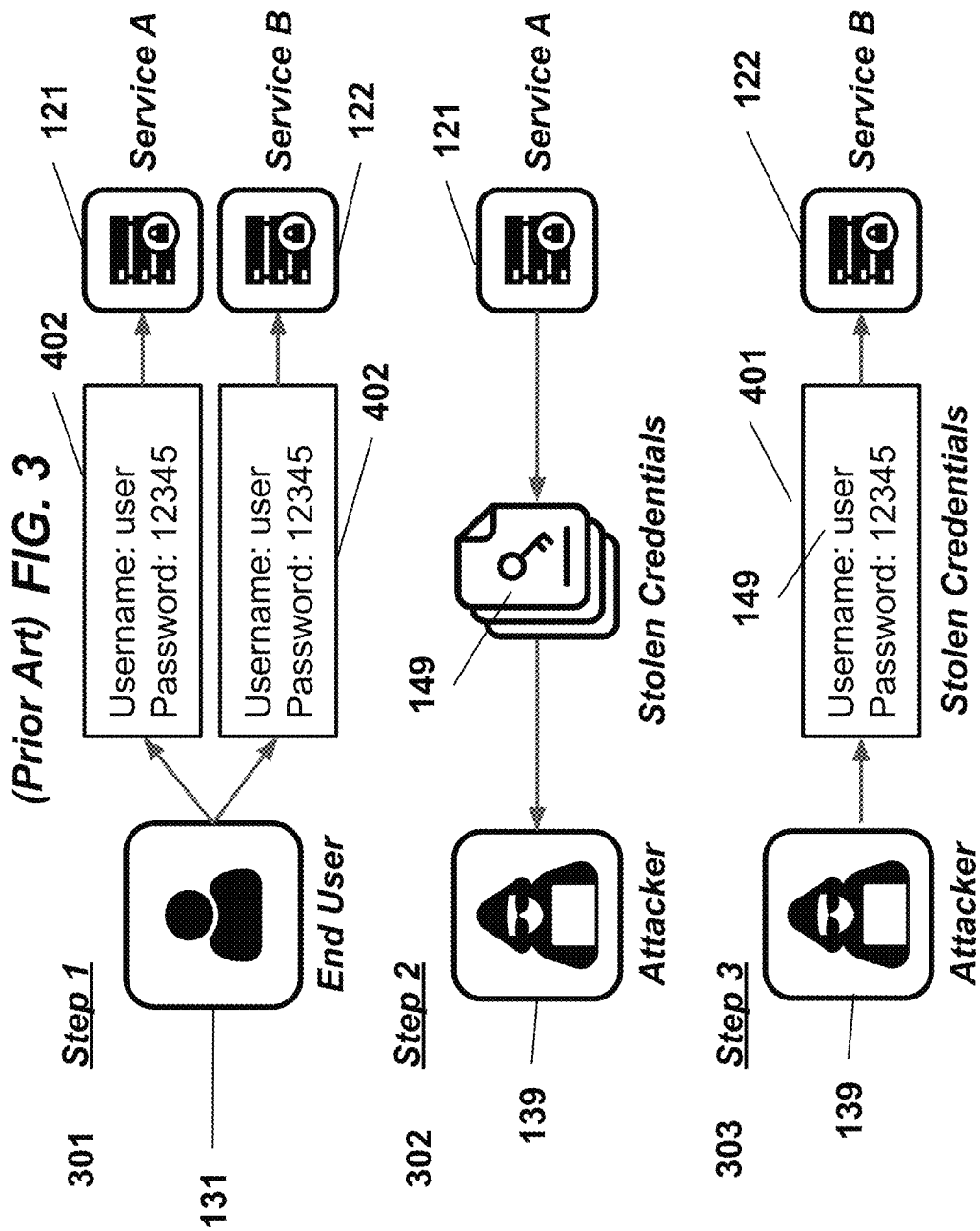
FIG. 3 shows a process of a credential stuffing attack.
Figure 8:
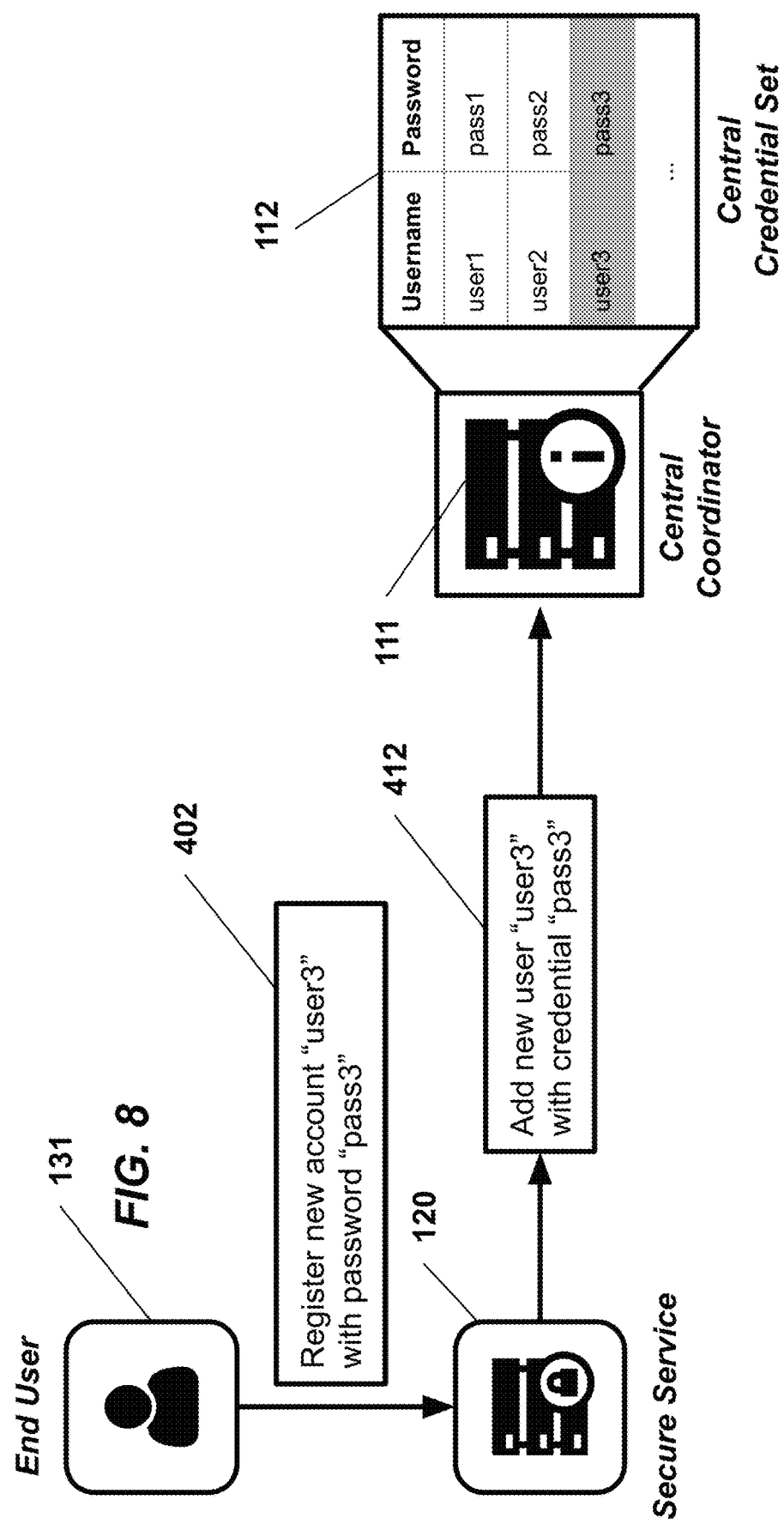
FIG. 8 shows a process of a secure service submitting a registration request to a central coordinator after receiving a user registration request according to one embodiment of the present disclosure.

Referring now to FIG. 8, in one embodiment, a registration request 412 is transmitted from the secure service to add a new credential to the central coordinator 111 in response to a new user registration request 402. The central coordinator 111 adds the provided credential to a central credential set 112 stored on the central coordinator 111, and it will be considered in any future queries to the central coordinator 111. It is useful for secure services to provide the central coordinator 111 with new user credentials 145 (FIG. 1) upon each new user registration request 402 to maintain currency of the central coordinator 111 and extend protections to users who registered with the secure service 120 after the initial set up process.

Figure 9:
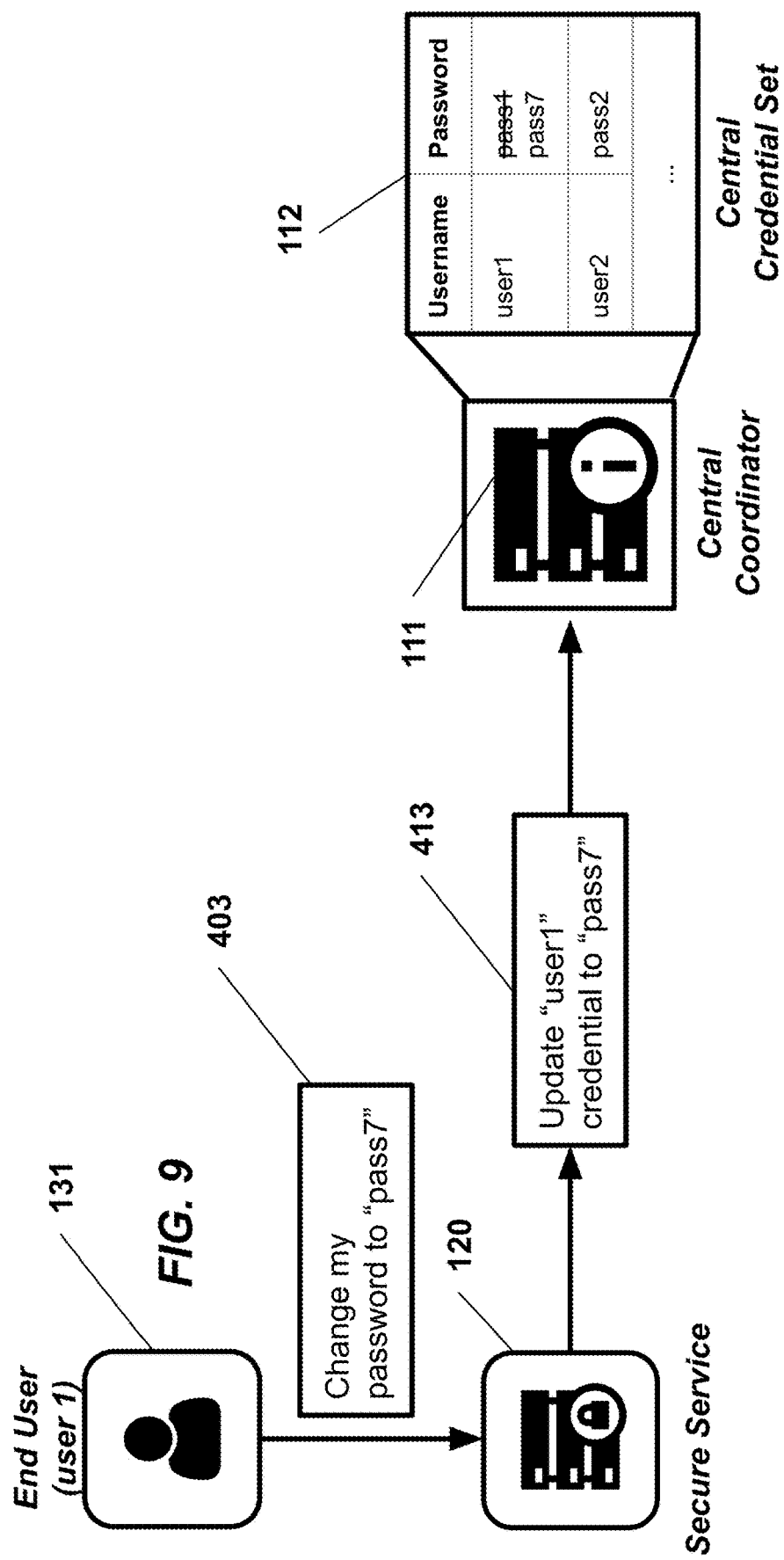
FIG. 9 shows a process of a secure service submitting a credential update request to a central coordinator after receiving a user credential change or reset request and the central coordinator subsequently overwriting the old credential according to one embodiment of the present disclosure.

Referring now to FIG. 9, in one embodiment, a credential update request 413 is transmitted from the secure service 120 to update a credential stored on a central coordinator 111 in response to a user credential change or reset request 403. The central coordinator 111 updates the stored central credential set 112 by changing the credential associated with the specified end user 131 to the new credential provided by the secure service 120. It is useful for secure services to provide the central coordinator 111 with updated user credentials 145 (FIG. 1) upon each credential change event to maintain the currency of the central coordinator 111.

Figure 10:
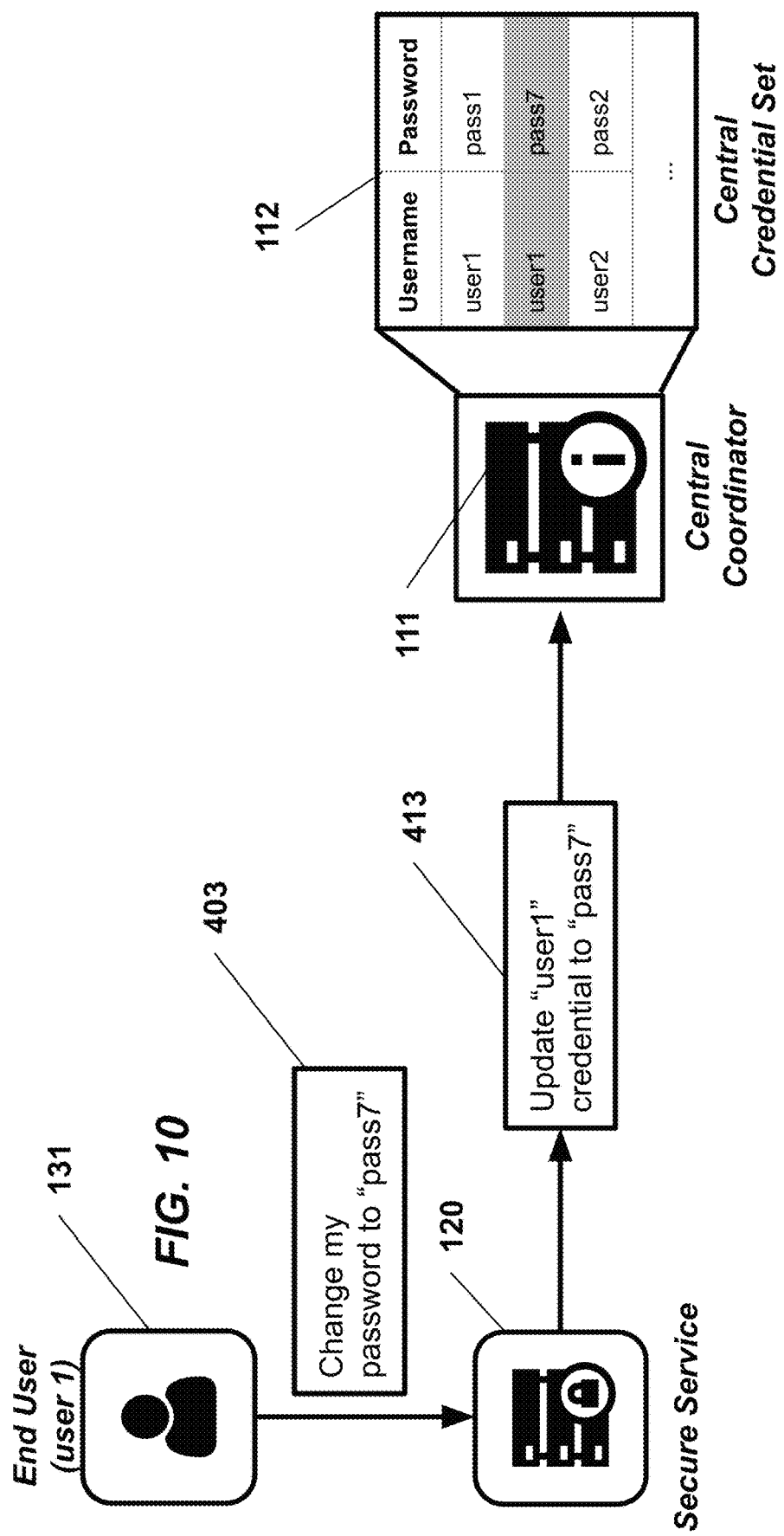
FIG. 10 shows a process of a secure service submitting a credential update request to a central coordinator after receiving a user credential change or reset request and the central coordinator subsequently recording both the old and new credentials according to one embodiment of the present disclosure.

Referring now to FIG. 10, in one embodiment, the central coordinator 111 maintains a record of both the old and new credentials of the end user 131 in the event of a user credential change or reset request 403 and subsequent credential update request 413. The central coordinator 111 therefore can reference previous credentials of users in addition to the current credentials of users. This variant prevents attackers who obtain previous credentials of users via a data breach of an outdated credential set of a service from using the previous credentials in a credential stuffing attack against a separate service without detection.

Figure 11:
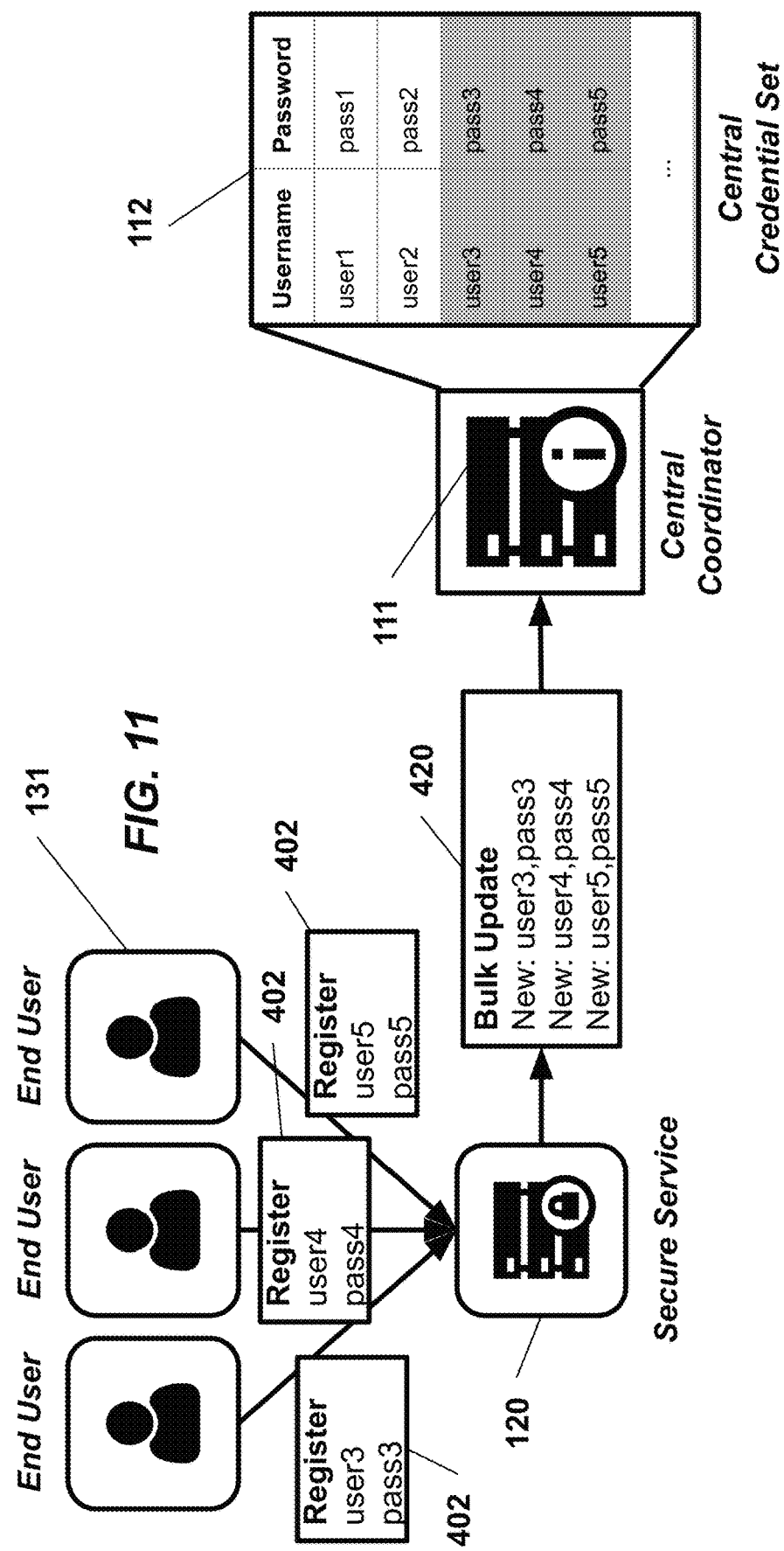
FIG. 11 shows a process of a secure service submitting a bulk request to a central coordinator after receiving multiple new user registration requests according to one embodiment of the present disclosure.

Referring now to FIG. 11, in one embodiment, multiple user credential change or new user registration requests 402 are processed within a single bulk request 420. This prevents the central coordinator 111 from being overwhelmed with a large number of individual requests when one or more of the associated services has a high volume of new user registrations 402 or credential changes.

Referring now to FIG. 12A, a secure service 120 queries a central coordinator 111 with a credential query 430 containing a queried credential 450 in response to a login request 401, and the central coordinator 111 responds with a credential response 431 containing a status code and/or status message 440 indicating whether the credential matches a credential used by the end user 131 on a separate service known to the central coordinator 111. Per the example of FIG. 12A, the queried username and password combination is already known to the central coordinator 111, causing the central coordinator 111 to respond with a status code and/or status message 440 indicating that the credential was reused. The secure service 120 therefore knows that the login request has an increased likelihood of corresponding to a credential stuffing attack. In the case that a queried username and password combination is not already known to the central coordinator 111, a response with a status code and/or status message 440 is transmitted from the central coordinator 111 indicating that the credential is unique, as shown in FIG. 12B.

Referring to FIG. 13A, in one embodiment, queried credentials are checked against the set of credentials associated with all users rather than just the credentials associated with the end user 131 for which they were queried. As a result, the central coordinator 111 responds with a status code and/or status message 440 indicating whether the same credential was used by any user on a service known to the central coordinator 111. This method has the additional benefit of detecting brute-force attacks where an entire credential set consisting of credentials from numerous users are used in an attempt to access the account of a single target user. As shown in FIG. 13A, the queried credential is already known to the central coordinator 111, causing the central coordinator 111 to respond with a status code and/or status message 440 indicating that the credential matches. The secure service 120 can then note the likelihood of a credential stuffing attack. Referring now to FIG. 13B, in the case that a queried credential is not already known to the central coordinator 111, credential response 431 is transmitted containing a status code and/or status message 440 indicating that the credential is unique.

Figure 14:
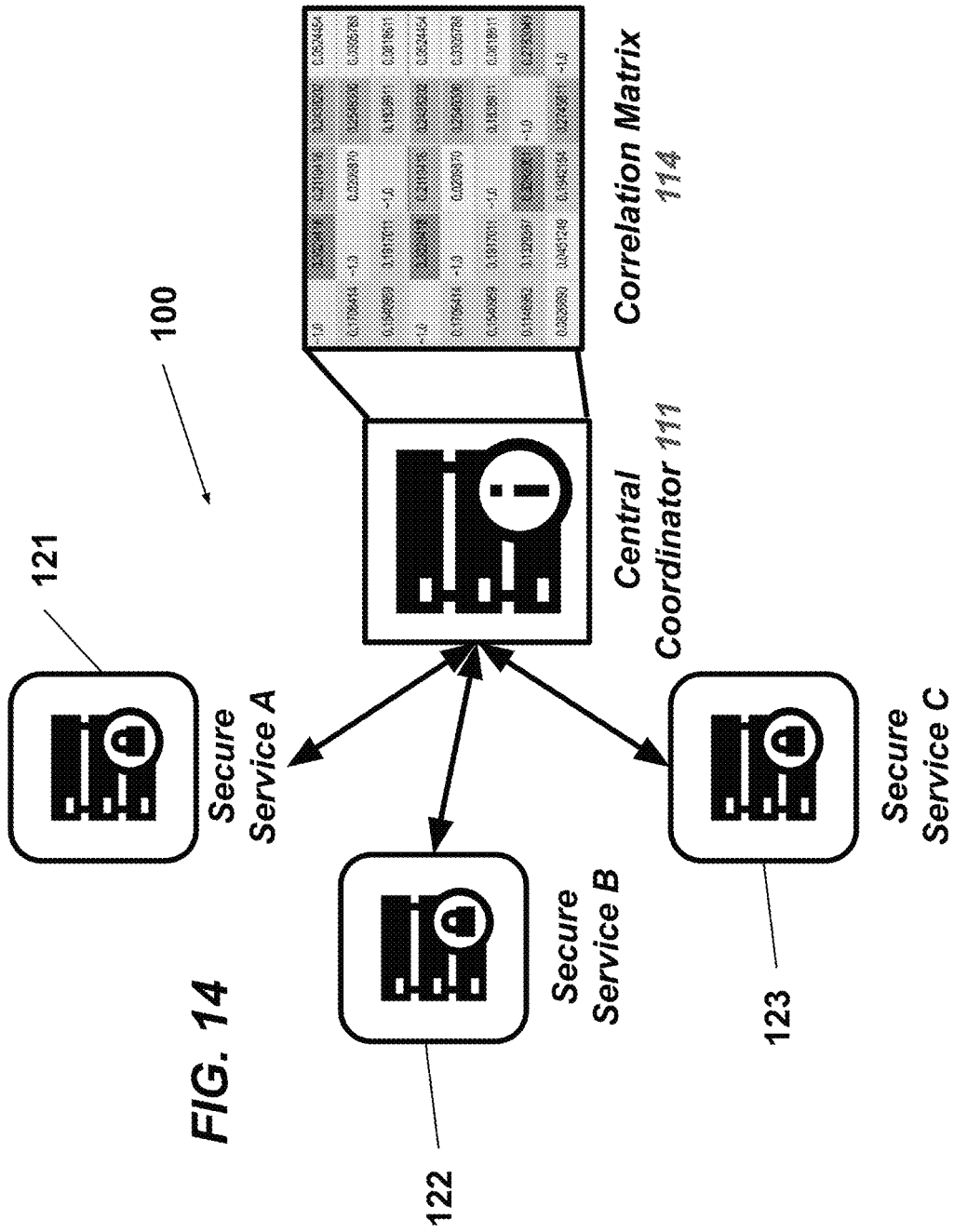
FIG. 14 shows a process of a central coordinator producing a correlation matrix according to one embodiment of the present disclosure.
Figure 15:
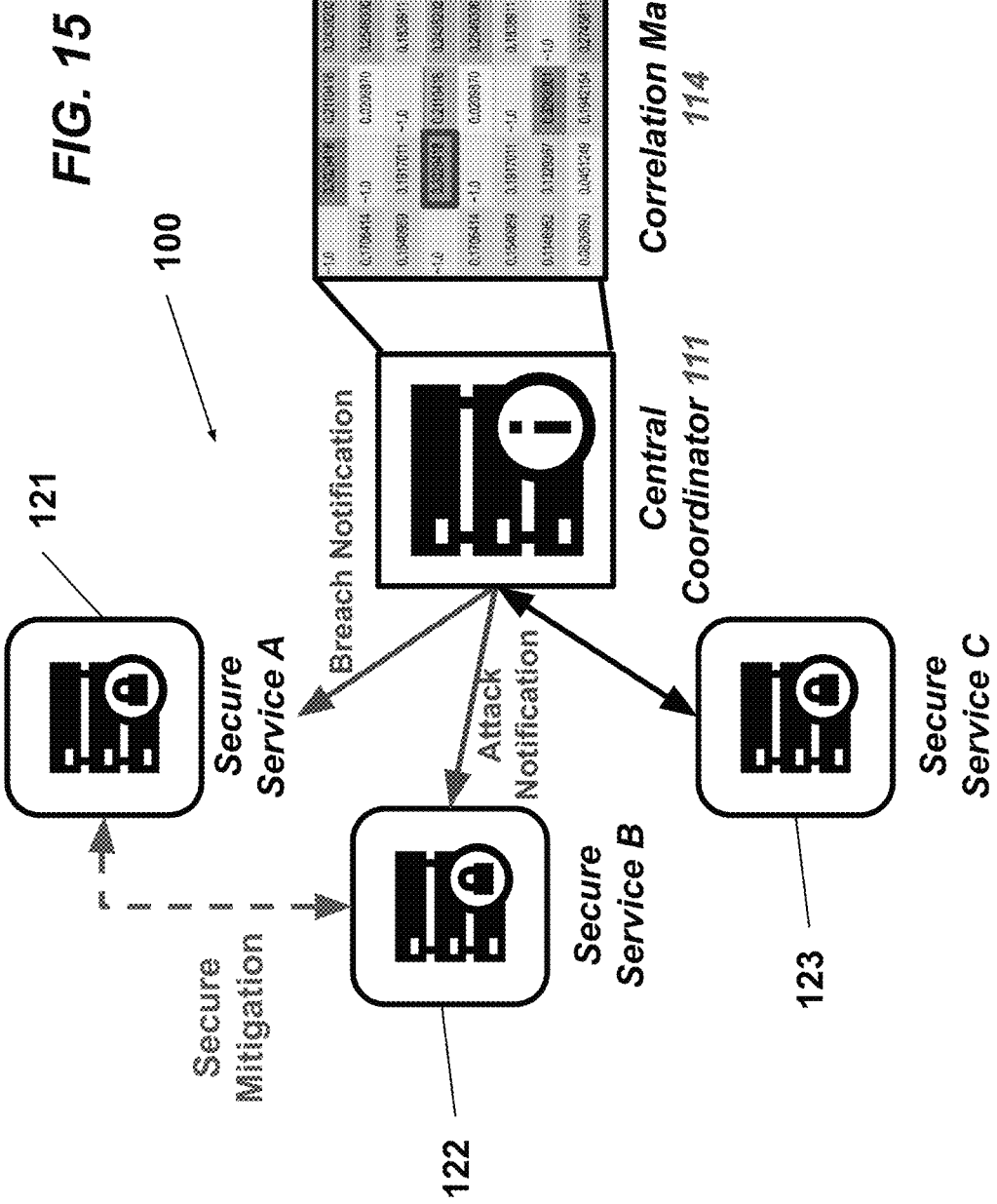
FIG. 15 shows a process of a central coordinator alerting one or more secure services of a breach and/or attack according to one embodiment of the present disclosure, and a secure mitigation process according to one embodiment of the present disclosure.

In one embodiment, shown in FIG. 14, the central coordinator 111 uses user credentials 145 and login traffic 143 to compute a correlation matrix 144 between the user credentials 145 and login traffic 143 of several services. It can then monitor said matrix for anomalously-high correlation values as an indication of a possible credential stuffing attack. In the event of a credential stuffing attack, the central coordinator 111 is likely to observe an anomalously high correlation between the login traffic 143 of the secure service 120 experiencing a credential stuffing attack and the user credentials 145 of the secure service 120 from which credentials were stolen, as shown on the right-hand side of FIG. 15. In one embodiment, the central coordinator 111 can then notify the secure service 120 suspected to be experiencing the credential stuffing attack and/or the secure service 120 suspected to have experienced a data breach, as shown in FIG. 15. In a further embodiment, those services can then directly cooperate to mitigate the ongoing attack, such as by establishing a direct communication channel and sharing attack metrics and/or using multi-party computation to more effectively discriminate between legitimate and illegitimate login attempts.

Figure 16:
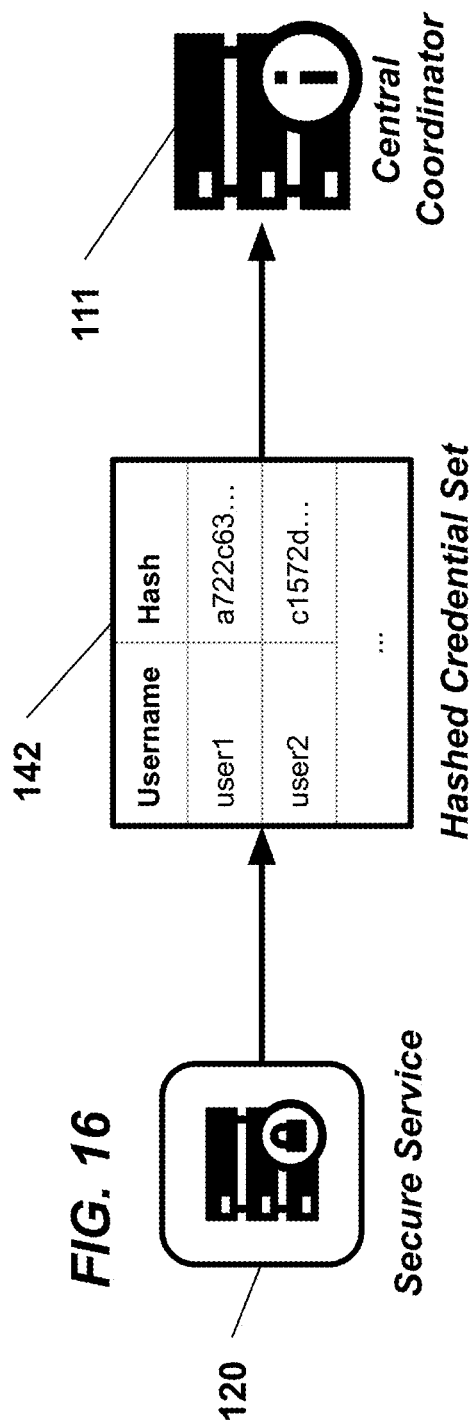
FIG. 16 shows a process of a secure service uploading a hashed credential set to a central coordinator according to one embodiment of the present disclosure.

Referring to FIG. 16, in one embodiment, cryptographic hashes of user credentials 145 are stored on the central coordinator 111 instead of storing credentials in plaintext. The secure service 120 uploads a hashed credential set 142 to the central coordinator 111 during an initial set up process, the hashed credential set 142 containing a cryptographic hash of each credential instead of containing credentials in plaintext format. Alternatively, the credentials may still be transmitted directly by the secure service 120 and transformed into cryptographic hashes by the central coordinator 111 prior to storage.

Figure 17:
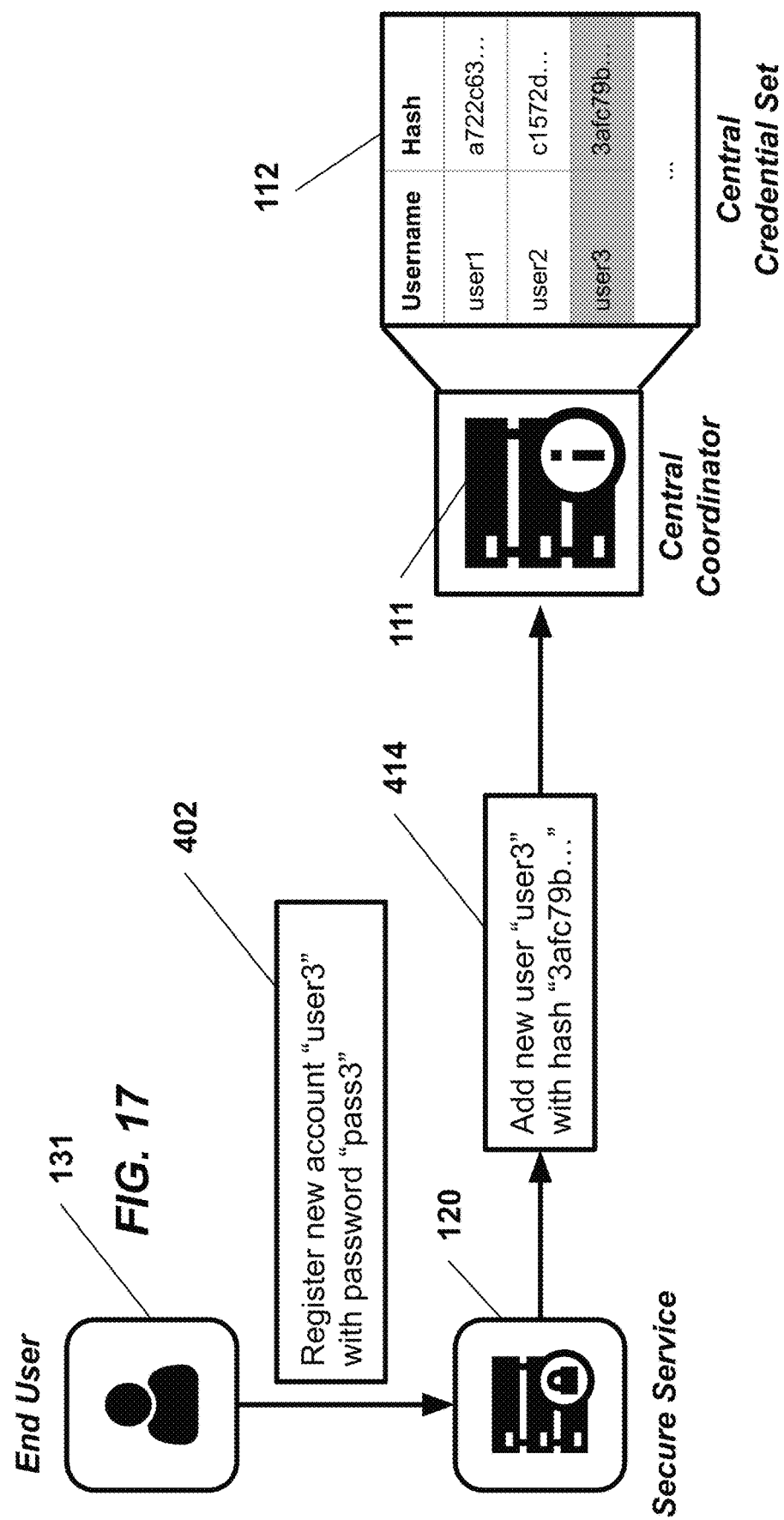
FIG. 17 shows a process of a secure service submitting a hashed registration request to a central coordinator after receiving a user registration request according to one embodiment of the present disclosure.

Referring now to FIG. 17, in one embodiment, when the secure service 120 adds a new credential to the central coordinator 111 in response to the new user registration request 402, the central coordinator 111 may provide a hashed registration request 414 containing a hash of the new credential, rather than providing the credential itself. Alternatively, the new credential may still be transmitted directly by the secure service 120 and transformed into a cryptographic hash by the central coordinator 111 prior to storage.

Figure 18:
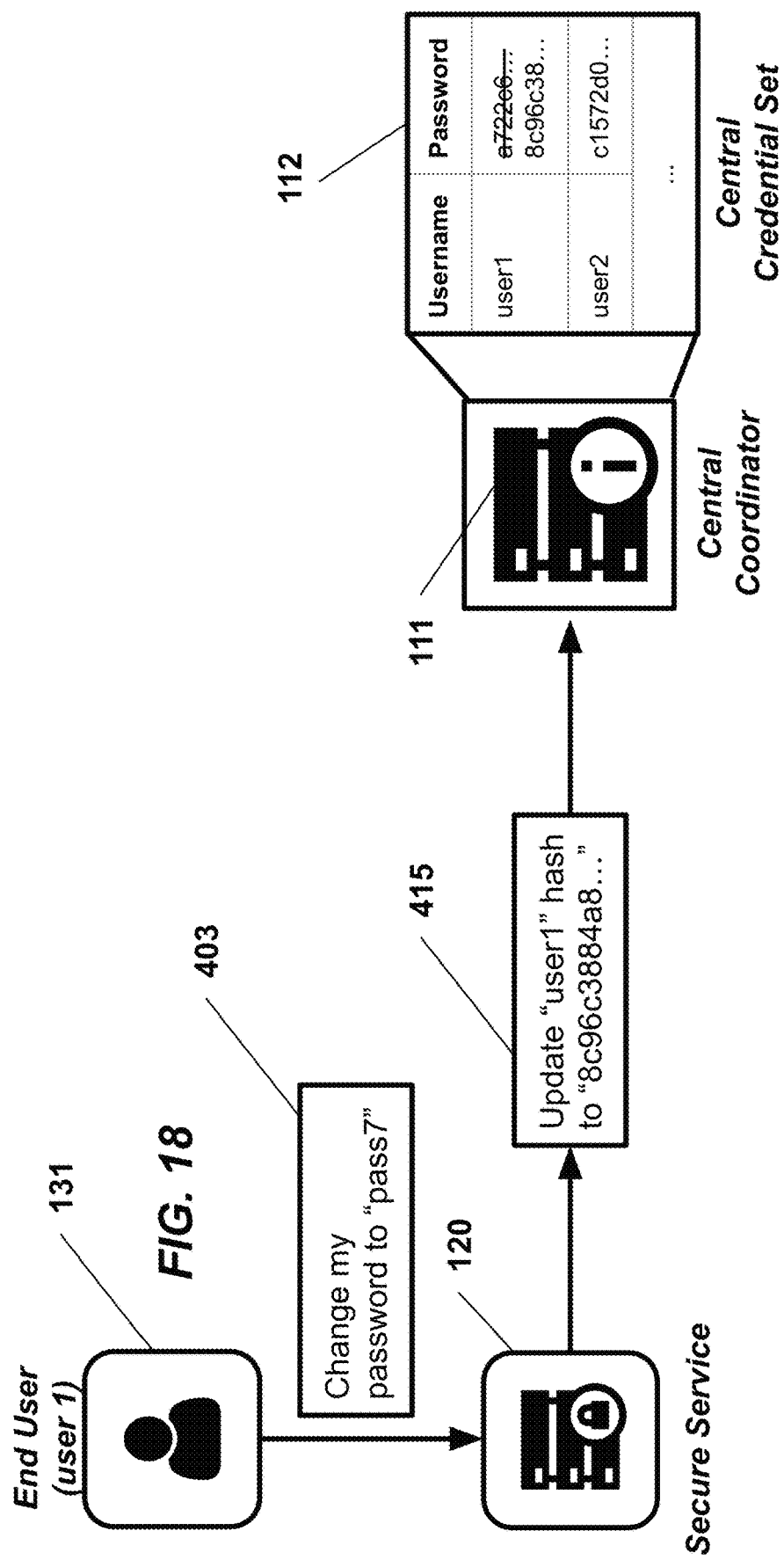
FIG. 18 shows a process of a secure service submitting a hashed credential change request to a central coordinator after receiving a user credential change or reset request according to one embodiment of the present disclosure.

Referring now to FIG. 18, in one embodiment, when a secure service 120 updates a credential stored on the central coordinator 111 in response to the user credential change or reset request 403, a hashed credential change request 415 may be provided containing a hash of the updated credential, rather than providing the new credential itself. Alternatively, the updated credential may still be transmitted directly by the secure service 120 and transformed into a cryptographic hash by the central coordinator 111 prior to storage.

Figure 19:
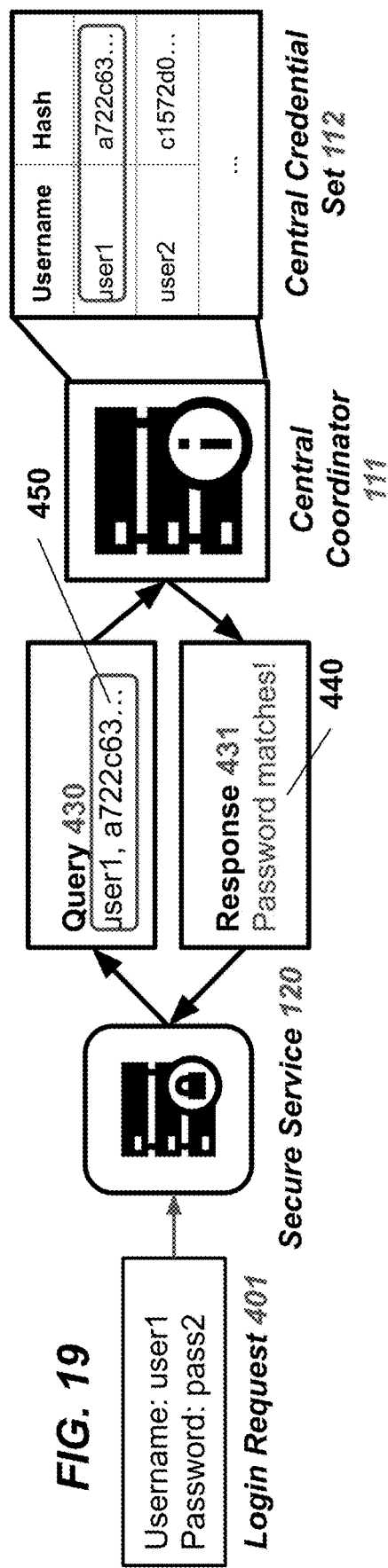
FIG. 19 shows a process of a secure service querying a central coordinator with a matching credential by providing a hash of the proposed credential according to one embodiment of the present disclosure.

Referring now to FIG. 19, when the secure service 120 queries the central coordinator 111 with the credential query 430 containing the queried credential 450, a hash of the proposed credential, as shown in FIG. 19 may be provided, rather than the credential itself. Alternatively, the proposed credential may still be transmitted directly by the secure service 120 and transformed into a cryptographic hash by the central coordinator 111 prior to being referenced against the stored hashes. Storage of cryptographic hashes rather than plaintext credentials prevents a data breach of the central coordinator 111 from exposing the user credentials 145 of all of the associated secure services. Transmission of credentials in their hashed form rather than plaintext prevents the interception of communications in transit from exposing user credentials 145. Alternatively, the central coordinator can store a hash of both a user identifier and user credential, for example in the form SHA256(user||pass). Secure services would similarly query the central coordinator by providing a hash of both the user identifier and queried credential 450.

Figure 20:
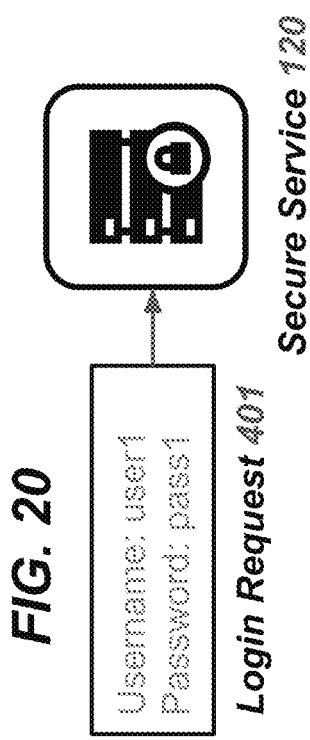
FIG. 20 shows a secure server not performing a query when receiving a valid login request according to one embodiment of the present disclosure.
Figure 21:
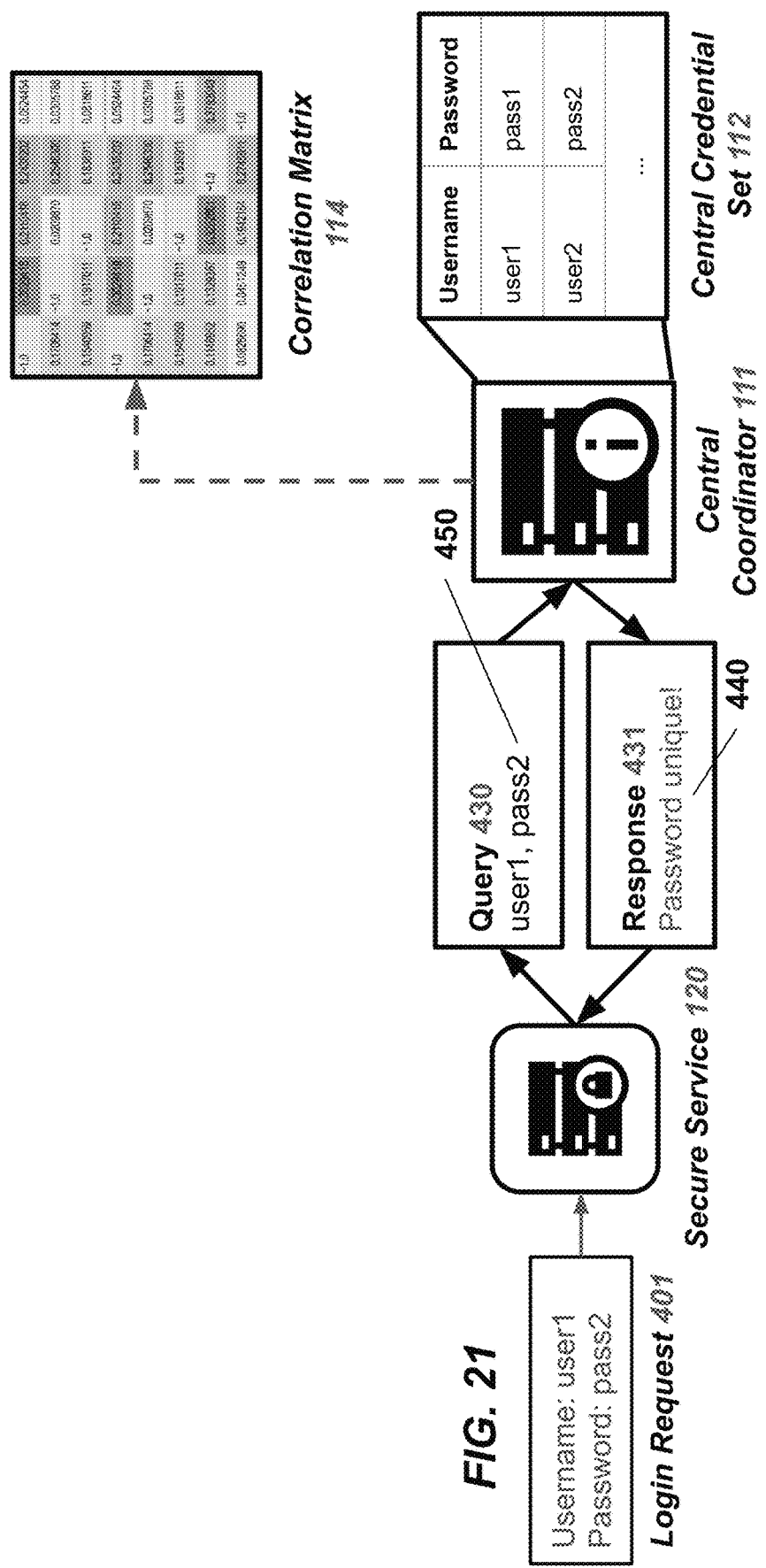
FIG. 21 shows a secure server performing a query when receiving an invalid login request according to one embodiment of the present disclosure.

In one embodiment, the secure service 120 may only queries the central coordinator 111 upon receiving an invalid login request. When a valid login request is received containing a valid user credential 145, the secure service 120 does not query the central coordinator 111 as shown in FIG. 20. However, when an invalid login request is received, the secure service 120 queries the central coordinator 111 with the credential contained in the invalid login request as shown in FIG. 21. As a result, a correlation matrix computed by the central coordinator 111 using this information represents the correlation between credential sets and invalid login attempts (rather than all login attempts), as shown on the right-hand side of FIG. 21. This approach may be useful not only in reducing the overall volume of requests to the central coordinator 111, but also in potentially reducing the false-positive rate of matches due to natural credential reuse.

Figure 22:
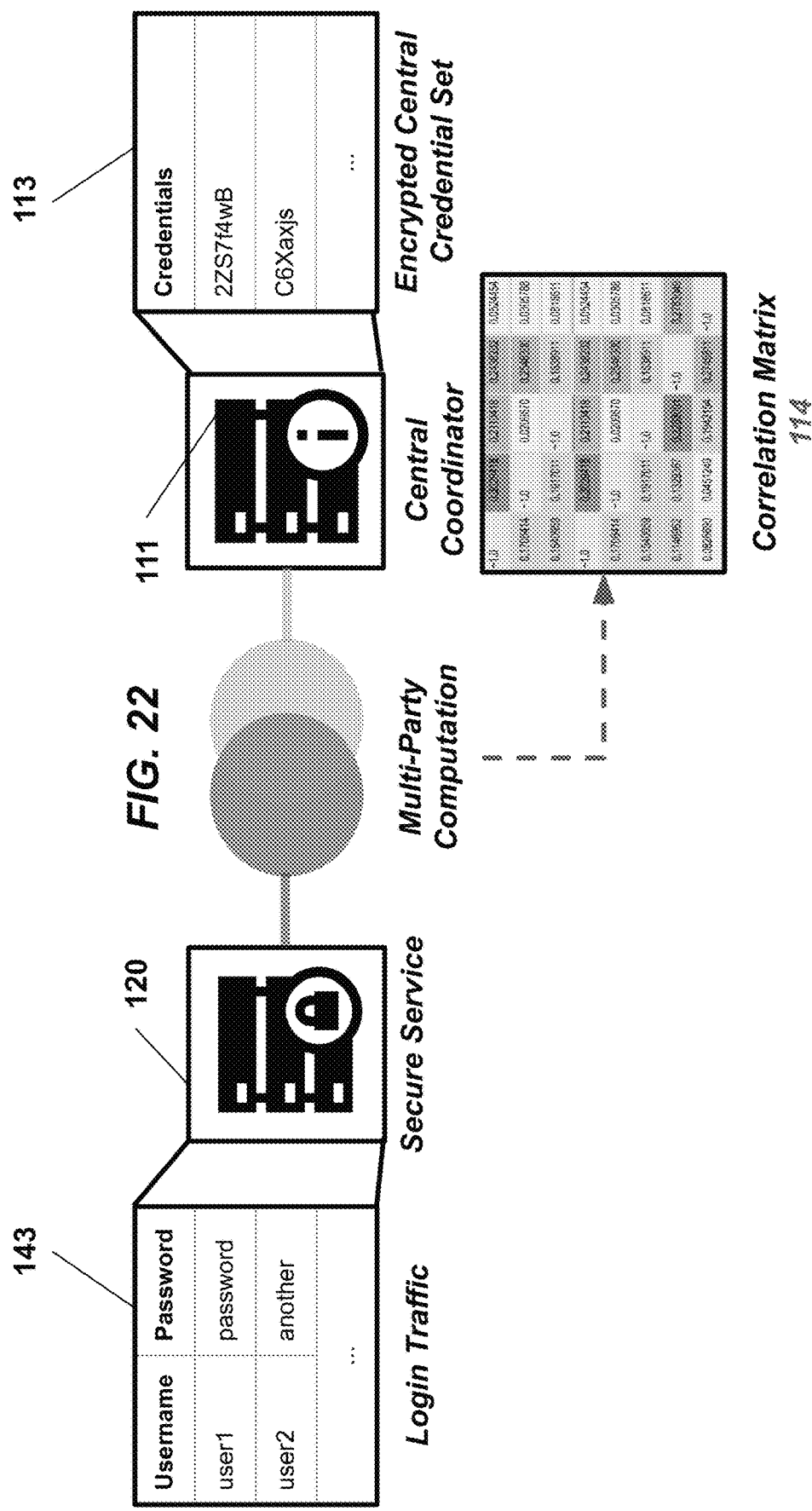
FIG. 22 shows a process of a multi-party computation using login traffic and an encrypted central credential set according to one embodiment of the present disclosure.

Referring now to FIG. 22, in one embodiment, secure multi-party computation between the central coordinator 111 and one or more secure services 120 is used to compute login traffic correlation and/or to produce a correlation matrix 114. For example, one or more Private Set Intersection (PSI) algorithms may be used to determine credentials that are present both in the login traffic 143 of the secure service 120 and in the encrypted central credential set 113 stored on the central coordinator 111. Private set intersection is a secure multiparty computation cryptographic technique that in this instance allows the intersection of the credential sets to be computed without either party revealing the credentials themselves. If only the volume of correlation, but not the specific infringing credentials are needed, then a Private Set Intersection Cardinality (PSI-C) algorithm may be used. Because revealing plaintext or even hashed user credentials 145 to an external system often constitutes a security violation, the use of a private set intersection to enable computation of login traffic correlation without revealing the credentials themselves is helpful for the compatibility of the system with many secure services.

The use of secure multi-party computation for cross-service credential comparison is technically advantageous over systems which compare plaintext credentials or hashes of credentials by preserving the security and privacy of the end user 131. While sharing plaintext user credentials is sufficient for detecting credential stuffing attacks, it allows services to learn the credentials of users of other services. This has the effect of compromising the privacy of the end user 131 by revealing the user's affiliation with the service. Additionally, in such a system, the compromise of a single service may result in the compromise of credentials from other services due to the sharing of credentials in plaintext. Although hashing user credentials prior to sharing them mitigates the security concerns, the privacy issues of publishing a user's affiliation with a service remains. Furthermore, users may be made vulnerable to targeted attacks by malicious services which attempt to reverse a hashed credential shared by another service using a brute-force method. Secure multi-party computation approaches including private set intersections avoid these pitfalls by providing cryptographic assurance that all services only learn the intersection of their user credentials. In a system for detecting credential stuffing attacks which utilizes a private set intersection, services will only be made aware of instances of login traffic correlation without learning anything about the users of other services where such correlation does not exist.

Figure 23:
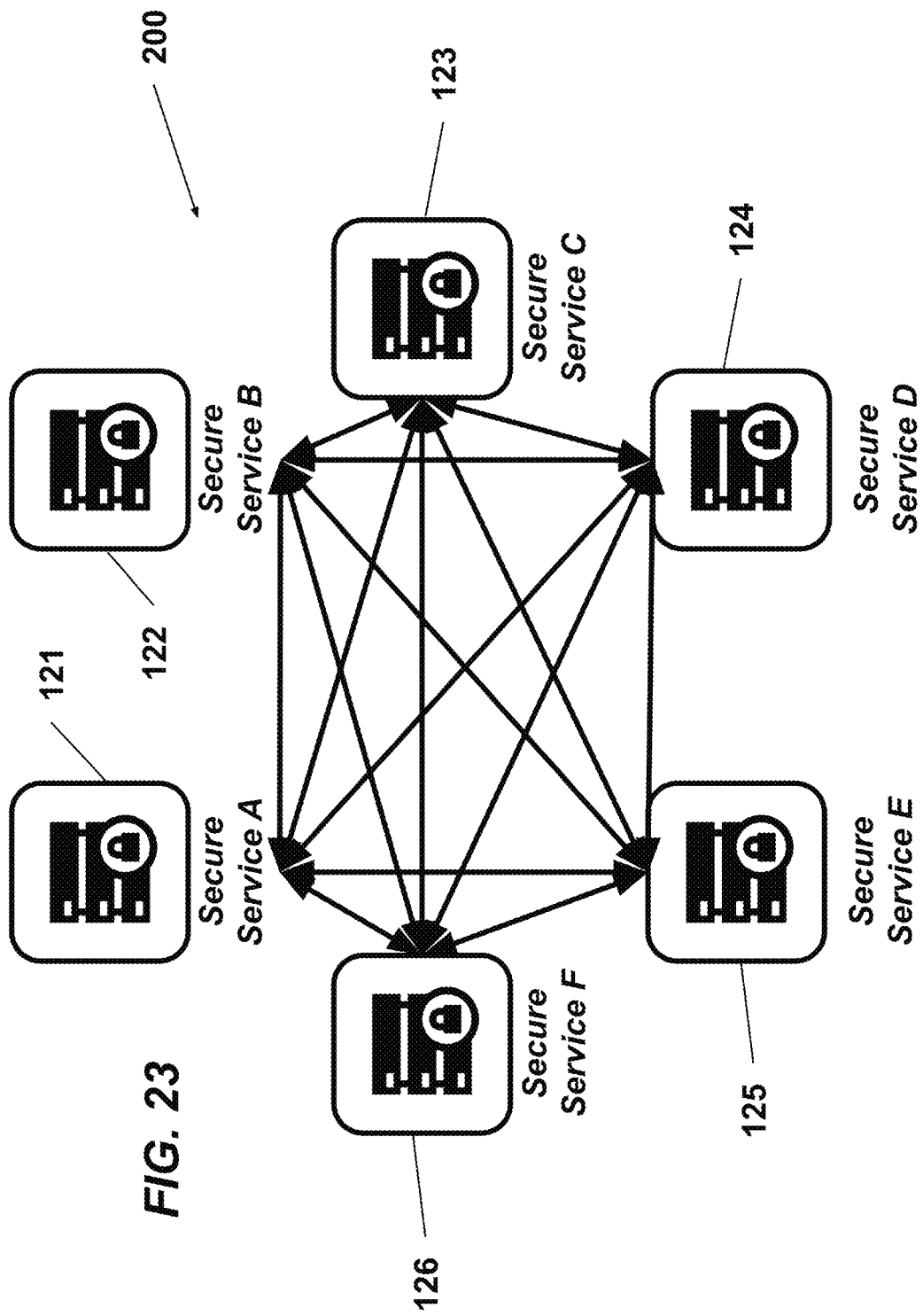
FIG. 23 shows a diagram of a decentralized system and method for detecting credential stuffing attacks according to one embodiment of the present disclosure.

FIG. 23 shows a basic embodiment of a decentralized system for detecting credential stuffing attacks 200 using two or more secure services 121-126 in communication with each other. Each of the two or more secure services 121-126 maintains its own set of user accounts and corresponding user credentials 145. When a secure service 120 receives a login attempt, the service may query other secure services 120 to determine if the credential matches an existing credential associated with a separate secure service 120. If the service determines that the credential associated with the login request matches a credential known to a separate secure service 120, there may be an increased likelihood that the login attempt was part of a credential stuffing attack.

Figure 24:
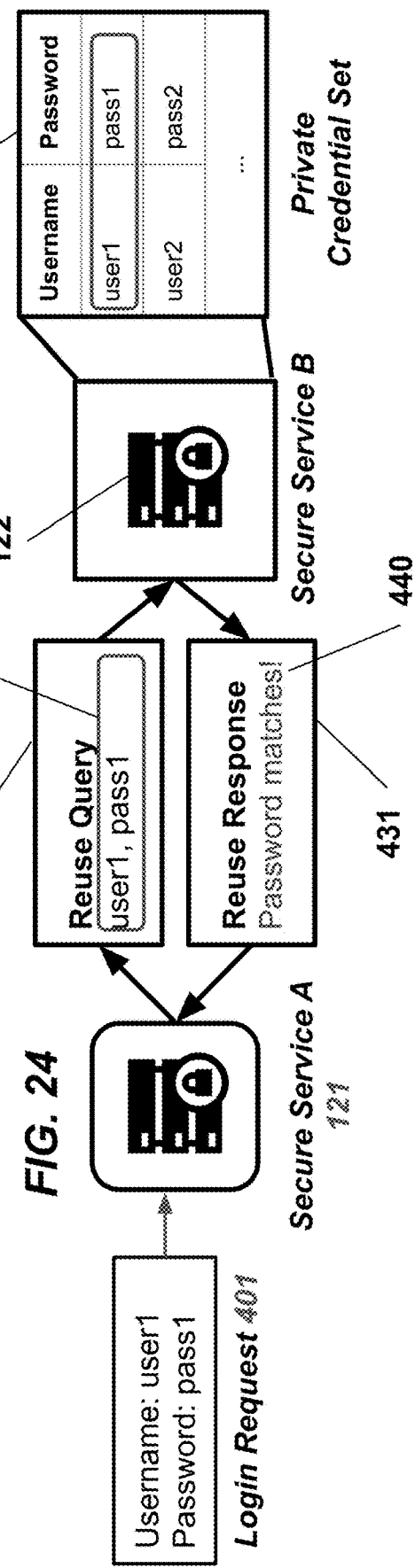
FIG. 24 shows a process of a secure service querying a separate secure service with a credential matching the same end user according to one embodiment of the present disclosure.
Figure 25:
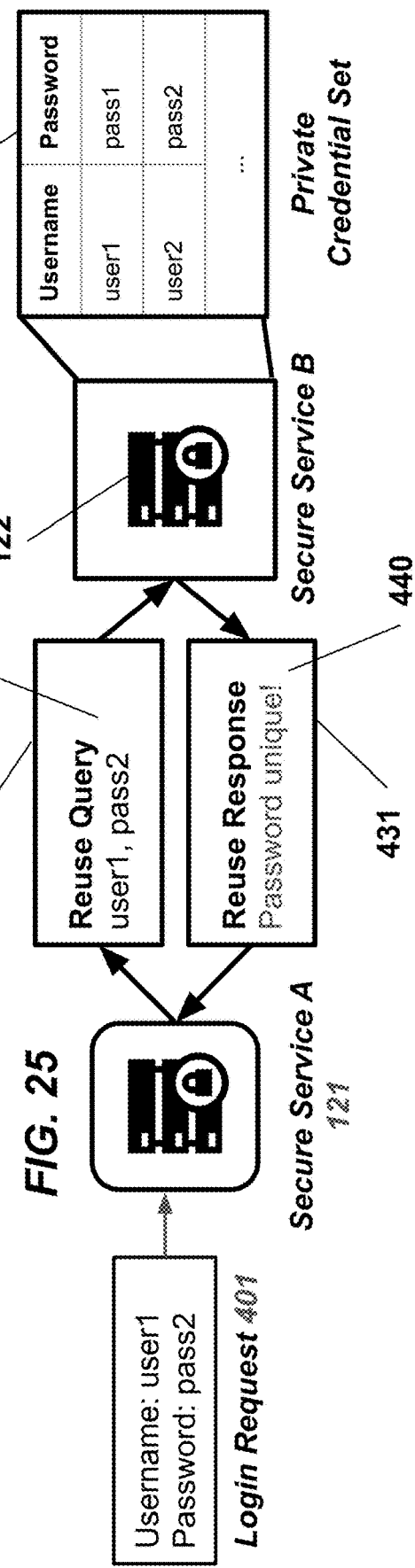
FIG. 25 shows a process of a secure service querying a separate secure service with a unique credential according to one embodiment of the present disclosure.

Referring to FIG. 24, the first secure service 121 queries the second secure service 122 with a credential query 430 containing a queried credential 450 in response to a login request 401, and the second secure service 122 responds with the credential response 431 containing a status code and/or status message 440 indicating whether the credential was used by an end user 131 on the second secure service 122. Per the example of FIG. 24, the queried username and password combination is already present in the private credential set 141 of the second secure service 122, causing it to respond with status code and/or status message 440 indicating that the credential matches. The first secure service 121 can then indicate an increased likelihood that the login attempt was part of a credential stuffing attack. Referring now to FIG. 25, in the case that a queried username and password combination is not already known to the second secure service 122, a credential response 431 is provided with status code and/or status message 440 indicating that the credential is unique.

Figure 26:
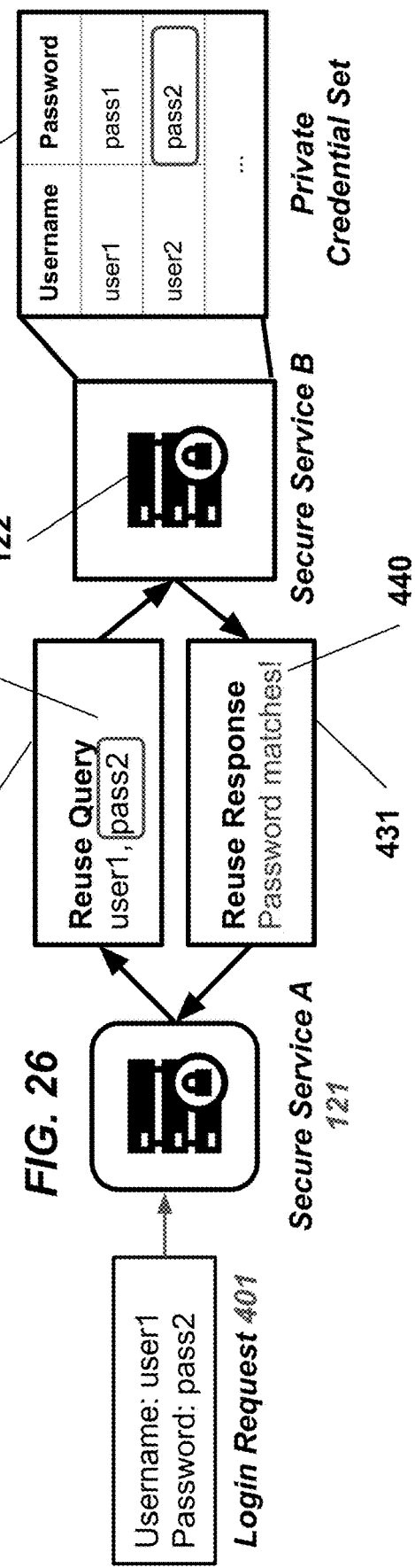
FIG. 26 shows a process of a secure service querying a separate secure service with a credential matching a different user according to one embodiment of the present disclosure.
Figure 27:
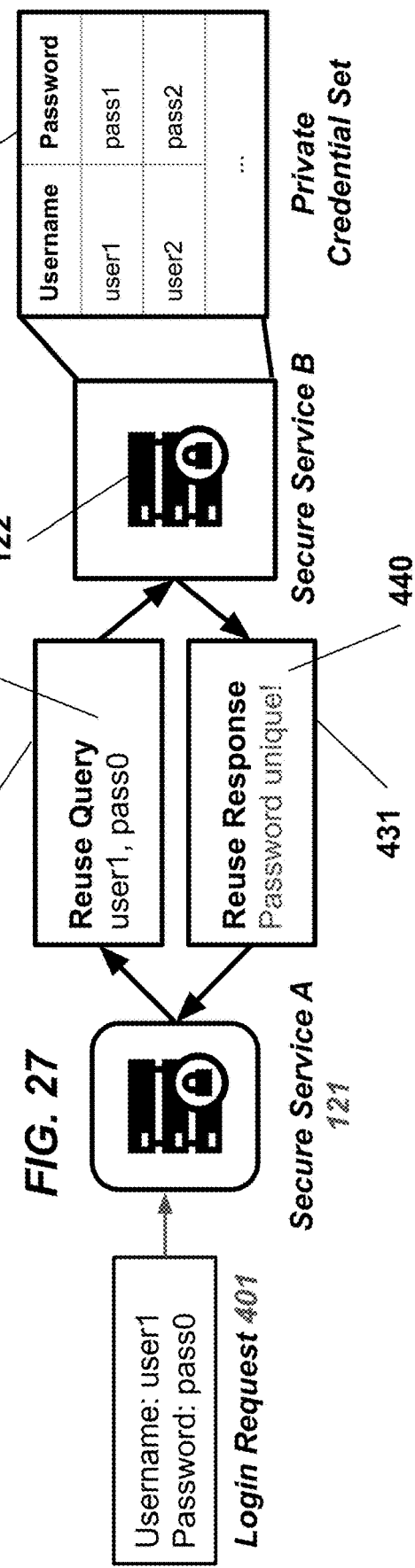
FIG. 27 shows a process of a secure service querying a separate secure service with a unique credential according to one embodiment of the present disclosure.

Referring to FIG. 26, in one embodiment, queried credentials are checked against the set of credentials associated with all users rather than just the credentials associated with the user for which they were queried. As a result, the second secure service 122 responds with credential response 431 containing status code and/or status message 440 indicating whether the same credential was used by any user. This method has the additional benefit of detecting brute-force attacks where an entire credential set consisting of credentials from numerous users are used in an attempt to access the account of a single target user. Per the example of FIG. 26, the queried credential is already known to the second secure service 122, causing the second secure service 122 to respond with status code and/or status message 440 indicating that the credential matches. The first secure service 121 can then indicate an increased likelihood that the login attempt was part of a credential stuffing attack. Referring now to FIG. 27, in the case that a queried credential is not already known to the second secure service 122, credential response 431 is provided with the status code and/or status message 440 indicating that the credential is unique.

Figure 28:
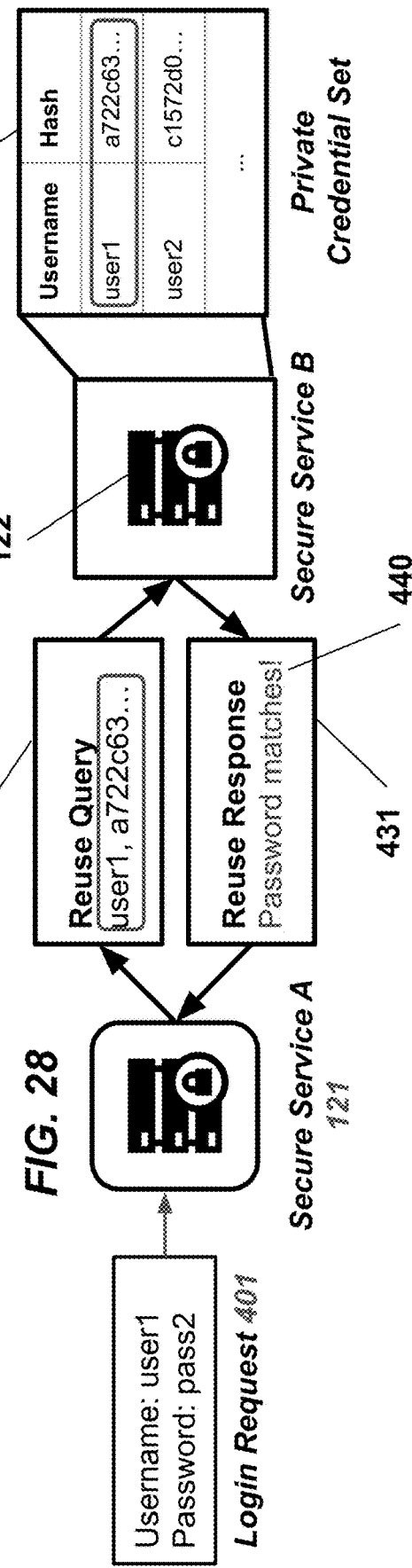
FIG. 28 shows a process of a secure service querying a separate secure service with a matching credential by providing a hash of the proposed credential according to one embodiment of the present disclosure.

Referring to FIG. 28, in one embodiment, cryptographic hashes of user credentials 145 are stored on at least one of the plurality of secure services instead of storing credentials in plaintext. When the first secure service 121 queries the second secure service 122 with credential query 430 containing a queried credential 450, a hash of the proposed credential may be provided, rather than providing the credential itself. Alternatively, the proposed credential may still be transmitted directly by the first secure service 121 and transformed into a cryptographic hash by the second secure service 122 prior to being referenced against the stored hashes. Transmission of credentials in hashed form rather than plaintext prevents the interception of communications in transit from exposing user credentials 145. Queries may alternatively be conducted by providing a combined hash of the user identifier and user credential, for example in the form SHA256(user∥pass).

Figure 29:
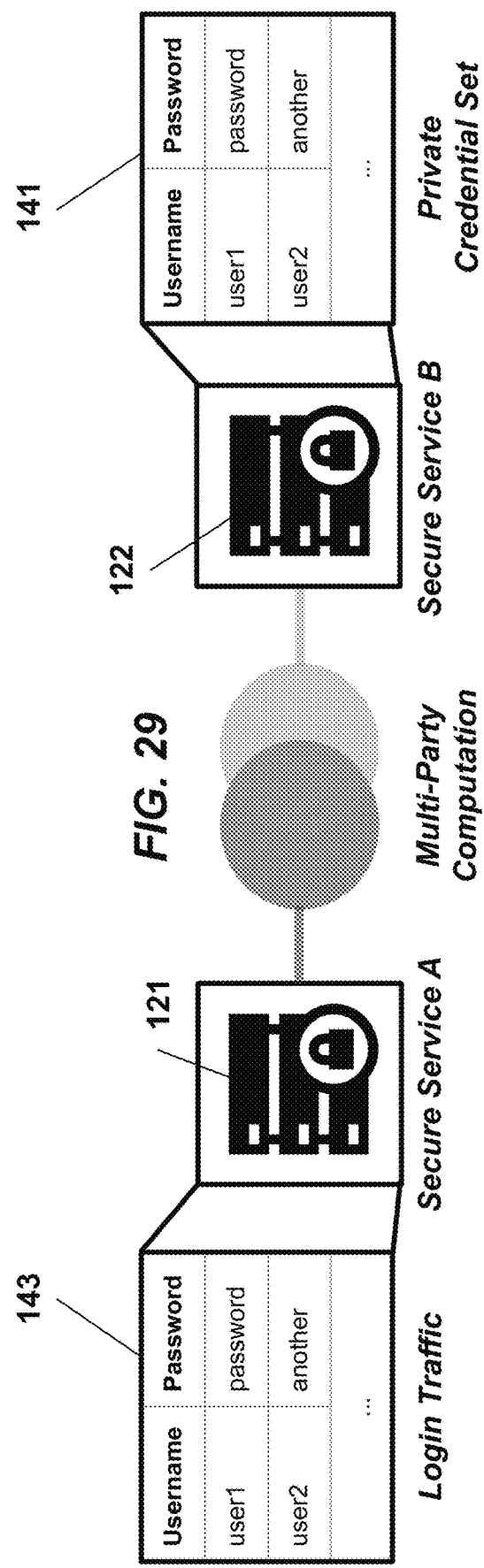
FIG. 29 shows a process of a multi-party computation using the login traffic of a first secure service and a private credential set of a second secure service according to one embodiment of the present disclosure.
Figure 30:
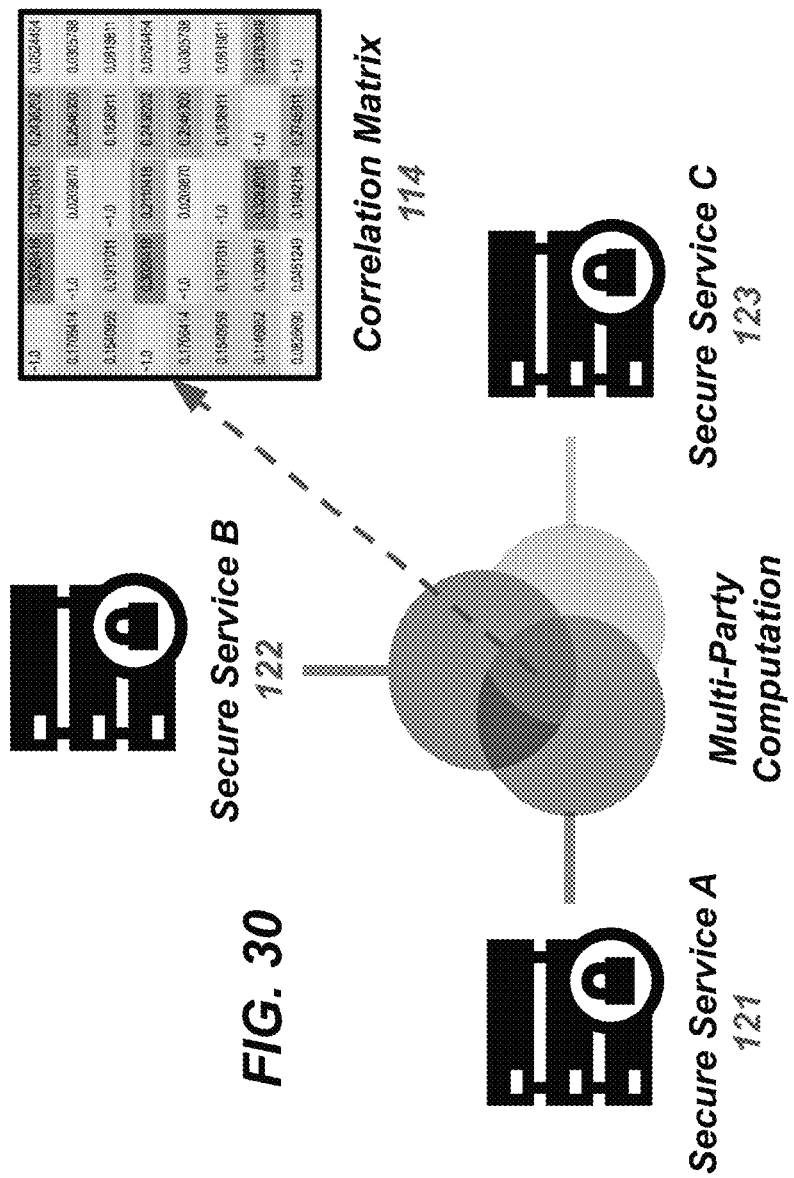
FIG. 30 shows a process of a multi-party computation of a correlation matrix by several secure services according to one embodiment of the present disclosure.

Referring now to FIG. 29, in one embodiment, secure multi-party computation is used to determine the correlation between the login traffic of a first secure service 121 and the private credential set 141 of a second secure service 122. For example, a private set intersection may be used to determine credentials that are present both in the login traffic 143 of the first secure service 121 and in the private credential set 141 of the second secure service 122. If only the volume of the correlation is needed, a private set intersection cardinality (PSI-C) algorithm may be used. In another embodiment, shown in FIG. 30, secure multi-party computation is used between several secure services 120 to compute a correlation matrix 114 between the private credential sets 141 and login traffic 143 of the services without directly revealing private user credentials 145 to other services, for example via the use of one or more private set intersection or private set intersection cardinality algorithms. Because revealing plaintext or even hashed user credentials 145 to another service often constitutes a security violation, the use of a private set intersection to enable detection of login traffic correlation (and thus a likely credential stuffing attack) without revealing the credentials themselves is helpful for the compatibility of the system with many secure services.

Figure 31:
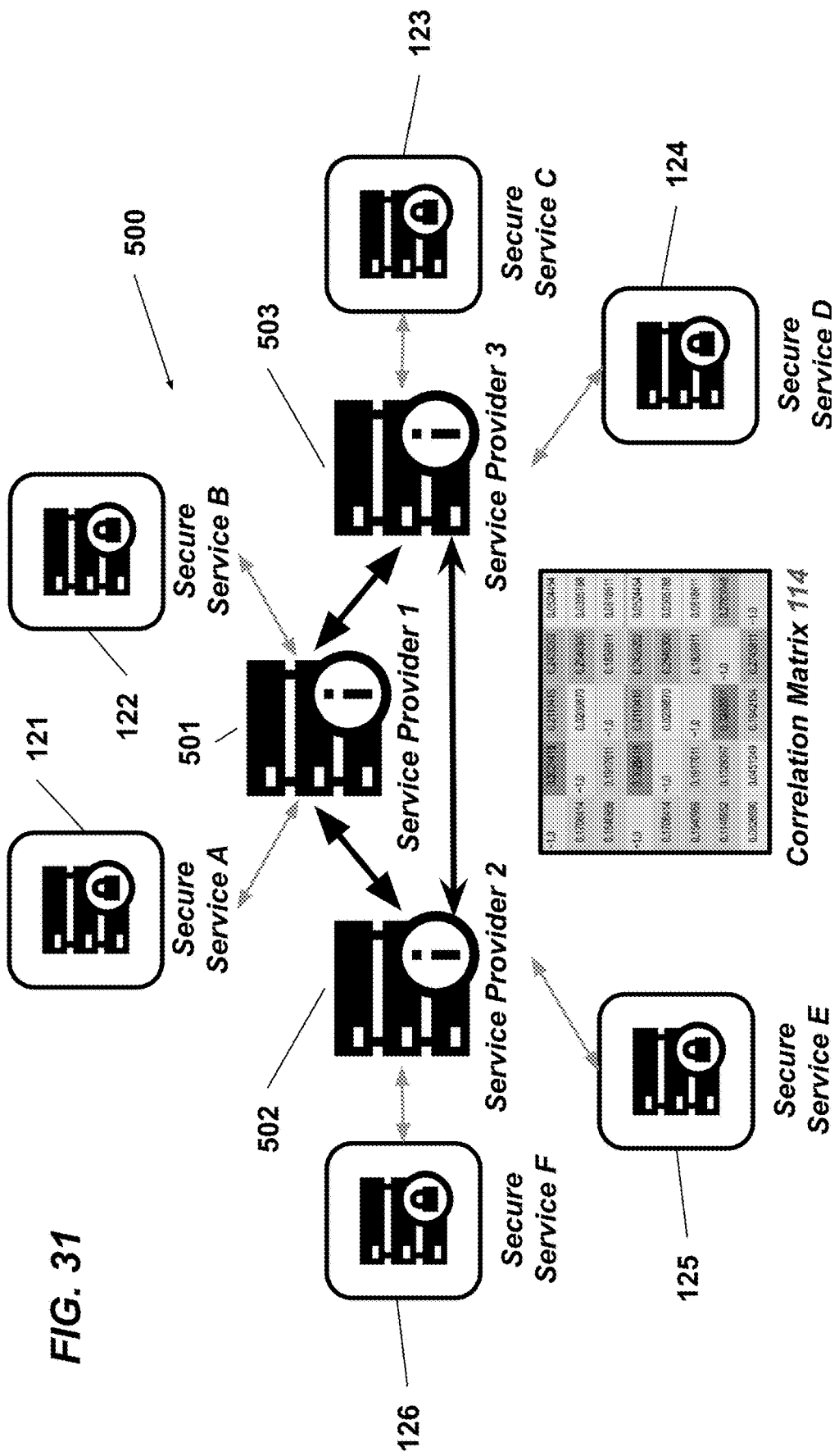
FIG. 31 shows a diagram of a federated system and method for detecting credential stuffing attacks according to one embodiment of the present disclosure.

FIG. 31 shows a basic embodiment of a federated system for detecting credential stuffing attacks 500 using two or more secure services 121-126 interacting with two or more service providers 501-503. The federated approach combines beneficial aspects of the centralized and decentralized approaches whereby secure services 121-126 each interface with the service provider 501-503 via a similar method to secure services 121-126 interfacing with the central coordinator 111 in the previously described centralized system for detecting credential stuffing attacks 100 while the service providers 501-503 interface with other service providers 501-503 via a similar method to secure services 121-126 interfacing with other secure services 121-126 in the previously described decentralized system for detecting credential stuffing attacks 200. For example, secure services 121-126 submit registration requests 412 and credential update requests 413 to the associated service provider 501-503, which maintains the credential set 112 containing credentials of associated services. Queries 430 by secure services 121-126 may be forwarded by service providers 501-503 to other service providers 501-503 in order to detect credential stuffing attacks across secure services 121-126 associated with separate service providers 501-503. Therefore while each service provider 501-503 is only responsible for storing credentials relating to their associated secure services 121-126, the service providers 501-503 still benefit from being able to detect credential stuffing attacks across multiple secure services 121-126 associated with separate service providers 501-503.

The system and method for detecting credential stuffing attacks described herein advantageously reduces the likelihood of an undetected credential stuffing attack against any services incorporating the system and method by securely and automatically detecting instances where login attempts received by a secure service 120 correlate strongly with user credentials of a separate secure service 120, a key indicator of a credential stuffing attack, and thereby allowing mitigation strategies to quickly be implemented.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method for detecting credential stuffing attacks using a centralized system, the method comprising:
    storing on a central coordinator data relating to a plurality of secure services hosted on a plurality of servers, wherein the central coordinator is hosted on at least one server;
    whereby the central coordinator is configured to receive communications from at least one of the plurality of secure services to determine whether a credential used in a login attempt on one of the plurality of secure services is used by a user of another of the plurality of secure services,
    whereby the central coordinator is configured to jointly execute a secure multi-party computation cryptographic protocol with at least one of the plurality of secure services,
    wherein a private set intersection of credentials is computed to enable detection of login traffic correlation without revealing the credentials, and
    wherein the central coordinator is configured to use the data relating to the plurality of secure services to compute a correlation matrix of the login traffic and credential sets of secure services.

2. The method of claim 1, wherein the central coordinator stores both current and previous credentials.

3. The method of claim 1, wherein bulk requests are used to perform more than one operation in a single query.

4. The method of claim 1, wherein cryptographic hashes of credentials are used by the central coordinator.

5. The method of claim 1, wherein credentials that are similar but not identical are identified.

6. The method of claim 1, wherein the central coordinator stores credentials that are known to be compromised.

7. The method of claim 1, wherein at least one of the plurality of secure services stores cryptographic hashes of credentials.

8. A method for detecting credential stuffing attacks using a decentralized system, the method comprising:
    hosting a plurality of secure services on a plurality of servers, each of the plurality of secure services having its own set of credentials, the plurality of secure services constituting a decentralized system;
    whereby at least one of the plurality of secure services communicates directly with at least one other of the plurality of secure services to determine whether a credential used in a login attempt for one of the plurality of secure services is used by another of the plurality of secure services,
    wherein a private set intersection of the credentials used in login attempts for one of the plurality of secure services and the credentials used by another of the plurality of secure services is computed to enable detection of login traffic correlation without revealing the credentials, and
    wherein secure multi-party computation is used to compute a correlation matrix of the login traffic and credential sets of the secure services.

9. The method of claim 8, wherein at least one of the plurality of secure services stores previous credentials in addition to current credentials.

10. The method of claim 8, wherein bulk requests are used to perform more than one operation in a single query.

11. The method of claim 8, wherein at least one of the plurality of secure services stores cryptographic hashes of credentials.

12. The method of claim 8, wherein credentials that are similar but not identical are identified.

13. The method of claim 8, wherein each of a plurality of entities in the decentralized system executes a substantively identical decentralized protocol such that no entity assumes a role of special privilege, authority, or trust in the decentralized system and no secure service serves a unique or centralized function in the decentralized system.

14. A method for detecting credential stuffing attacks using a federated system, the method comprising:
    hosting a plurality of secure providers on a first plurality of servers which store data relating to a plurality of secure services hosted on a second plurality of servers, wherein the plurality of service providers hosted on the first plurality of servers constitute a decentralized system;
    whereby at least one of the plurality of service providers is configured to receive communications from at least one of the plurality of secure services to determine whether a credential used in a login attempt on one of the plurality of secure services is used by a user of another of the plurality of secure services,
    whereby at least one of the plurality of service providers is configured to communicate with at least one other of the plurality of service providers to determine whether a credential used in a login attempt on one of the plurality of secure services is used by a user of another of the plurality of secure services, wherein secure multi-party computation is used to compute a correlation matrix, and wherein a private set intersection of credentials is computed to enable detection of login traffic correlation without revealing the credentials.

15. The method of claim 14, wherein at least one of the plurality of service providers stores previous credentials in addition to current credentials.

16. The method of claim 14, wherein bulk requests are used to perform more than one operation in a single query.

17. The method of claim 14, wherein at least one of the plurality of service providers stores cryptographic hashes of credentials.

18. The method of claim 14, wherein credentials that are similar but not identical are identified.

19. The method of claim 14, wherein each of the plurality of service providers in the decentralized system executes a substantively identical decentralized protocol such that no service provider assumes a role of special privilege, authority, or trust in the decentralized system and no service provider serves a unique or centralized function in the decentralized system.

* * * * *